US010297073B2

(12) United States Patent
Wald

(10) Patent No.: US 10,297,073 B2
(45) Date of Patent: May 21, 2019

(54) METHOD AND APPARATUS FOR IN-PLACE CONSTRUCTION OF LEFT-BALANCED AND COMPLETE POINT K-D TREES

(71) Applicant: Intel Corporation, Santa Clara, CA (US)

(72) Inventor: Ingo Wald, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 15/053,693

(22) Filed: Feb. 25, 2016

(65) Prior Publication Data

US 2017/0249781 A1    Aug. 31, 2017

(51) Int. Cl.
*G06T 17/00*    (2006.01)
*G06T 15/00*    (2011.01)
*G06T 1/20*    (2006.01)

(52) U.S. Cl.
CPC ............ *G06T 17/005* (2013.01); *G06T 1/20* (2013.01); *G06T 15/005* (2013.01)

(58) Field of Classification Search
None
See application file for complete search history.

(56) References Cited

U.S. PATENT DOCUMENTS

| 8,253,730 B1 * | 8/2012 | Carr ................. G06T 17/005 345/419 |
| 2014/0149677 A1 * | 5/2014 | Jayasena ............ G06F 12/0862 711/137 |

OTHER PUBLICATIONS

Shevtsov, Maxim, Alexei Soupikov, and Alexander Kapustin. "Highly Parallel Fast KD-tree Construction for Interactive Ray Tracing of Dynamic Scenes." Computer Graphics Forum. vol. 26. No. 3. Blackwell Publishing Ltd, 2007.*
Wald et al., "CPU Ray Tracing Large Particle Data with Balanced P-k-d Trees", 2014, 8 pages.
Bentley, Jon Louis, "Multidimensional Binary Search Trees Used for Associative Searching", Comm. of ACM, vol. 18, No. 9, Sep. 1975, pp. 509-517.

* cited by examiner

*Primary Examiner* — Nurun N Flora
(74) *Attorney, Agent, or Firm* — Womble Bond Dickinson (US) LLP

(57) ABSTRACT

Embodiments provide for a graphics processing apparatus including logic to receive data from an input buffer. The data can define a set of data points, where each data point includes one or more dimensions. The logic is configured to process the received data points to perform in-place construct a left-balanced and complete point k-d tree of the data points within the input buffer.

20 Claims, 21 Drawing Sheets

HEAP BASED IN-PLACE K-D TREE CONSTRUCTION - 1500

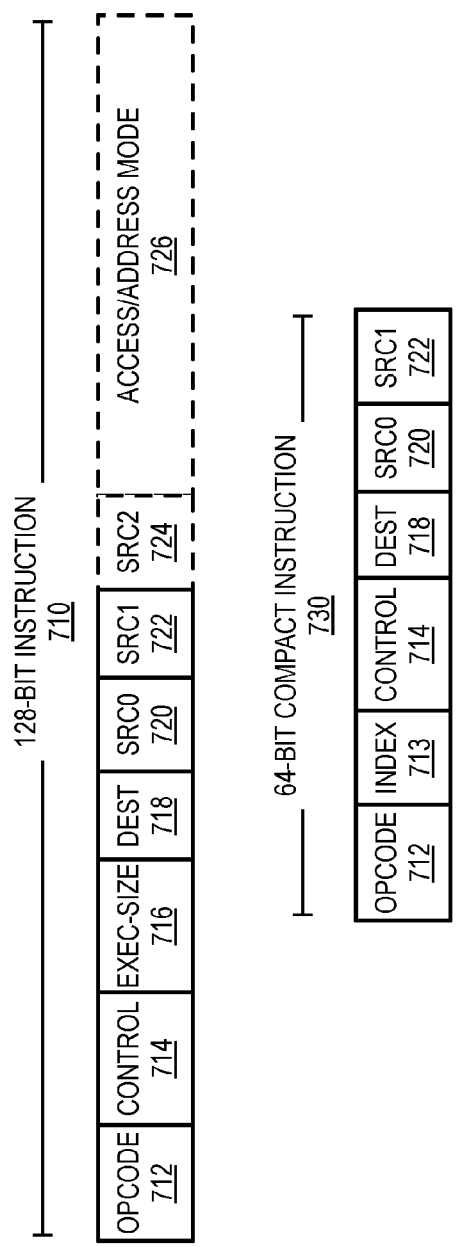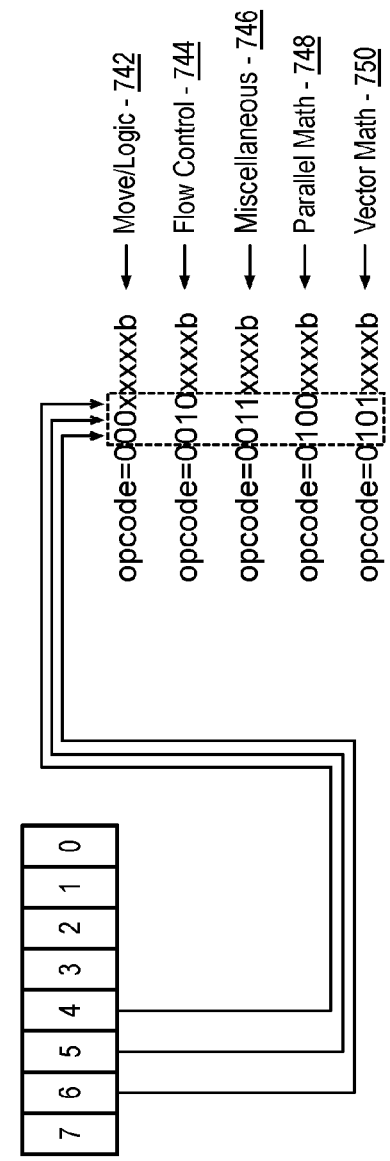
FIG. 7

METHOD AND APPARATUS FOR IN-PLACE CONSTRUCTION OF LEFT-BALANCED AND COMPLETE POINT K-D TREES

TECHNICAL FIELD

Embodiments generally relate to processing logic, including graphics processing logic. More particularly, embodiments relate to in-place construction of left-balanced and complete point k-d trees.

BACKGROUND

K-d trees are multi-dimensional (e.g., k-dimensional) search trees used for a large number of different applications in computer science. K-d trees are a special case of binary space partitioning trees and can be used for searches involving a multidimensional search key, such as range searches and nearest neighbor searches. Every non-leaf node of a k-d tree can be thought of as implicitly generating a splitting hyperplane that divides the space into two half-spaces. Points to the left of the splitting hyperplane are represented by the left sub-tree of that node. Points to the right of the hyperplane are represented by the right sub-tree. One key advantage of k-d trees is that in their "left-balanced and complete" form their entire topology can be encoded by simply arranging the points in the proper order, without requiring any memory for storing the tree topology.

A number of serial and parallel algorithms exist for building k-d trees, with proven optimal O(N log N) run time complexity. However, all algorithms known in the art require a temporary copy of the data to be stored in memory, which can be prohibitive for large data sets, which may include billions of data points. Existing techniques work by recursively finding the m-th median out of a list of points, while using a properly chosen m to ensure a balanced tree. The techniques then use that element as a sub-tree's root node, and recurse the list of points to the left and right of that point, respectively. These techniques require constant re-arranging of the as-yet-unprocessed particles, so existing techniques typically use two lists of particles: one list for the points that are not yet placed and one list for the final array of where nodes are written into as soon as their position is determined.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

DESCRIPTION OF EMBODIMENTS

Figure 1:
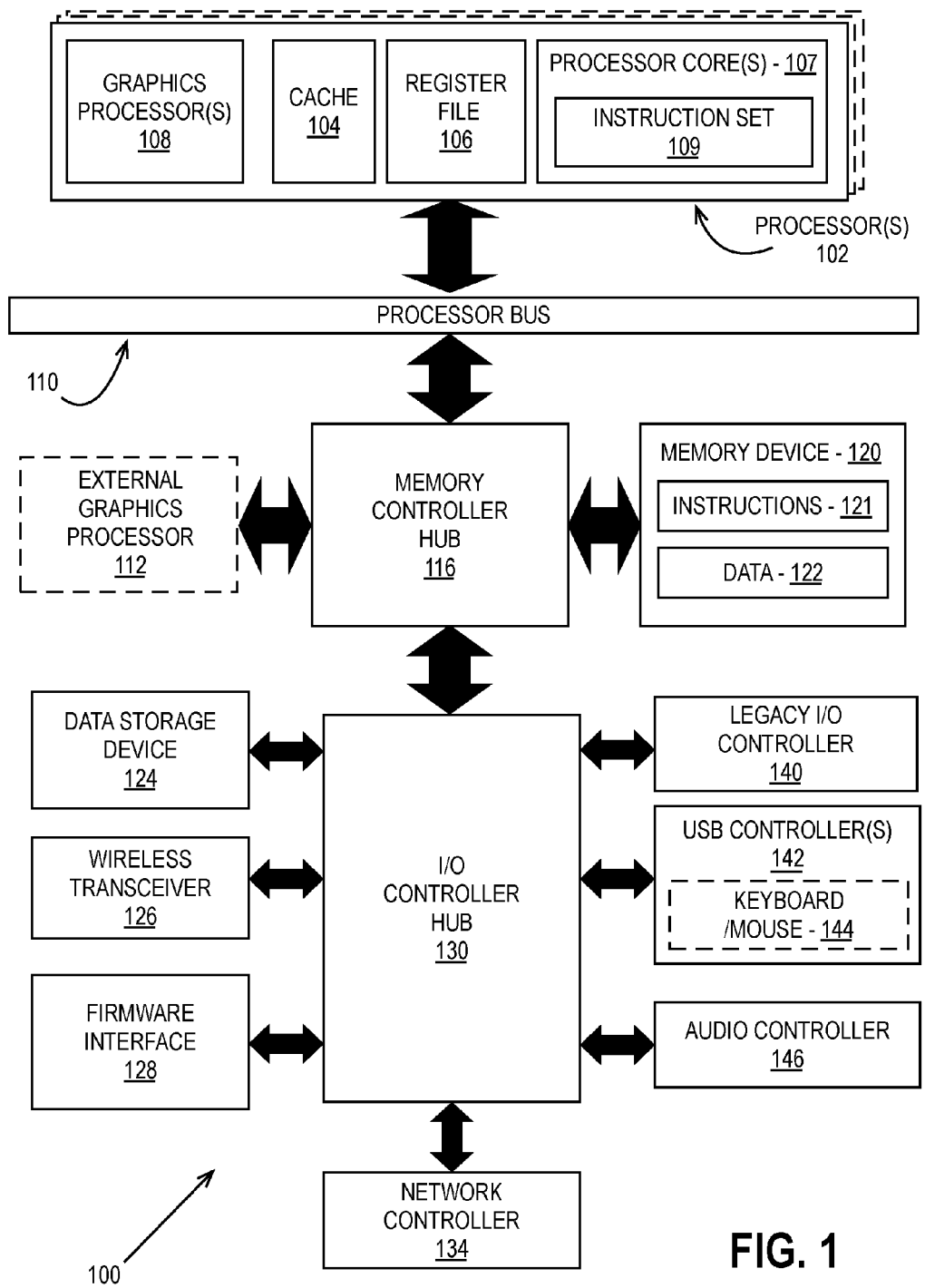
FIG. 1 is a block diagram of an embodiment of a computer system with a processor having one or more processor cores and graphics processors.

Described herein is a method and apparatus to perform multiple techniques that enable in-place construction of left-balanced complete k-d trees via a sequence of point swapping operations. The in-place construction techniques described herein do not require a copy of the input data and significantly reduce the amount of memory required for computing hardware to execute these techniques. These techniques have large applicability to computer science in general and computational devices employing these methods can realize reduced memory requirements when performing point-based data operations, including database operations, pattern matching operations, and computer graphics operations such as photon mapping and ray-tracing.

The k-d trees described herein refer to general k-dimensional search trees rather than to the specialized binary space partitioning (BSP) acceleration data structures used in ray-tracing that sometimes use a similar name. In particular, k-d trees are used to store some k-dimensional data points rather than geometric primitives. The logic described herein is optimized to construct pointer-less, left-balance and complete k-dimensional trees. In a complete k-d tree, all but the lowest levels of the tree are filled. In a left-balanced k-d tree, all but the lowest, and possibly partially filled, level is filled from the left. The pointer-less k-d tree does not require overhead for pointers between parent and child nodes. Instead, the parent to child node relationship is mathematically defined.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-21 provide specific details of the various embodiments. Although some of the following embodiments are described with reference to a graphics processor, similar techniques and teachings can be applied to other types of circuits or semiconductor devices, including general purpose processors or many integrated core processors, as the teachings are applicable to any processor or machine that manipulates or processes image or vertex data, or any data that may be realized as a set of k-dimensional points.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
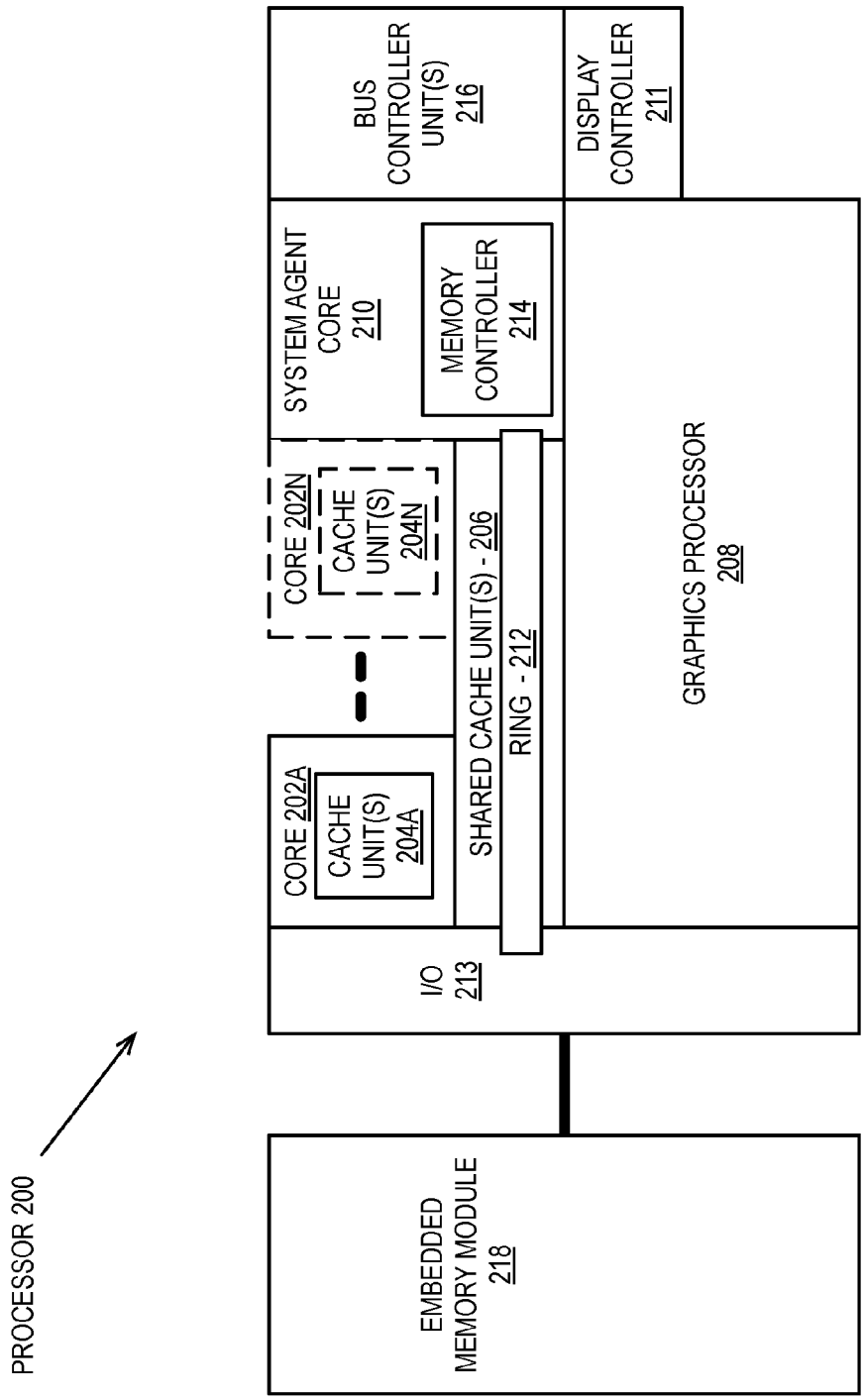
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
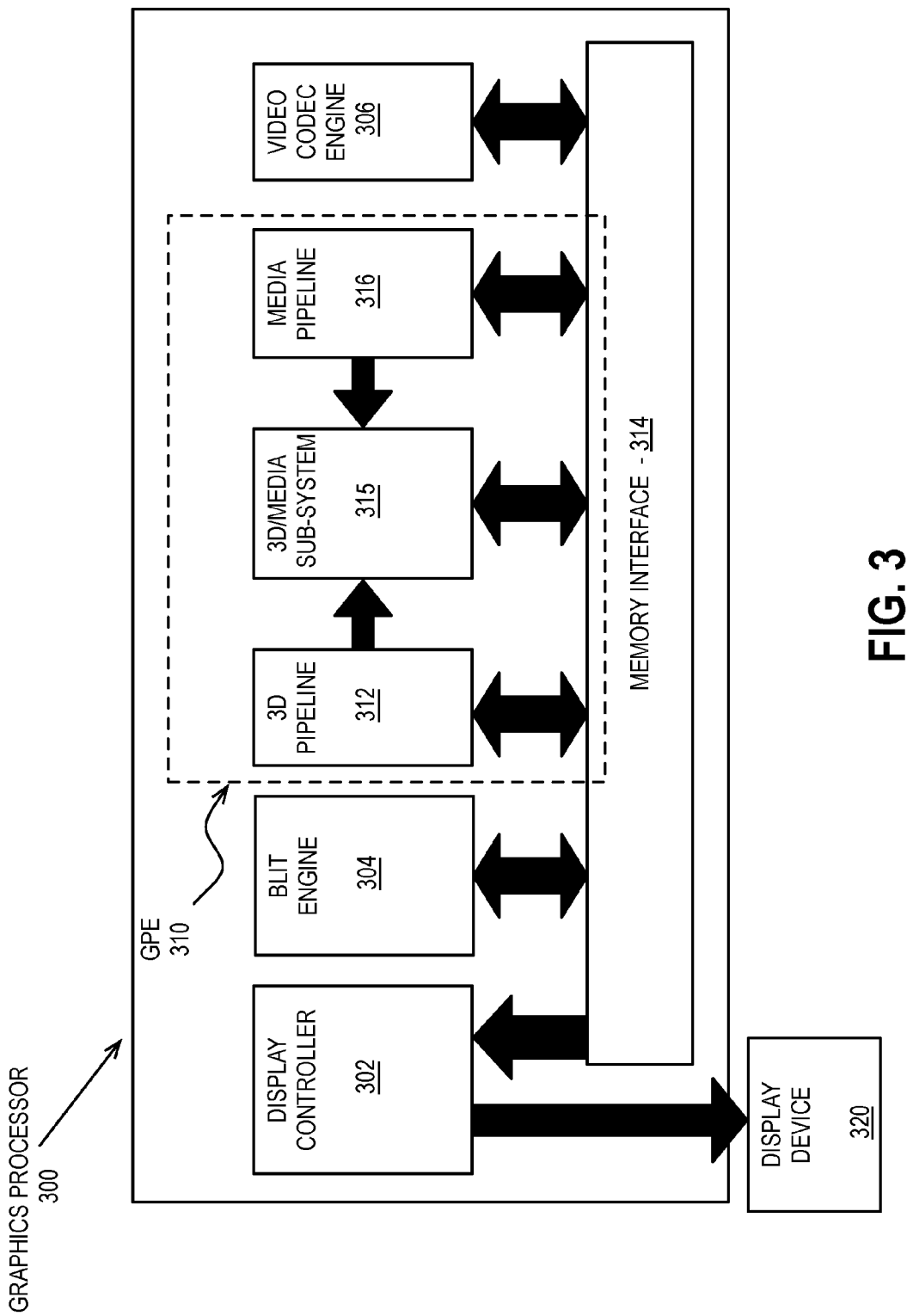
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
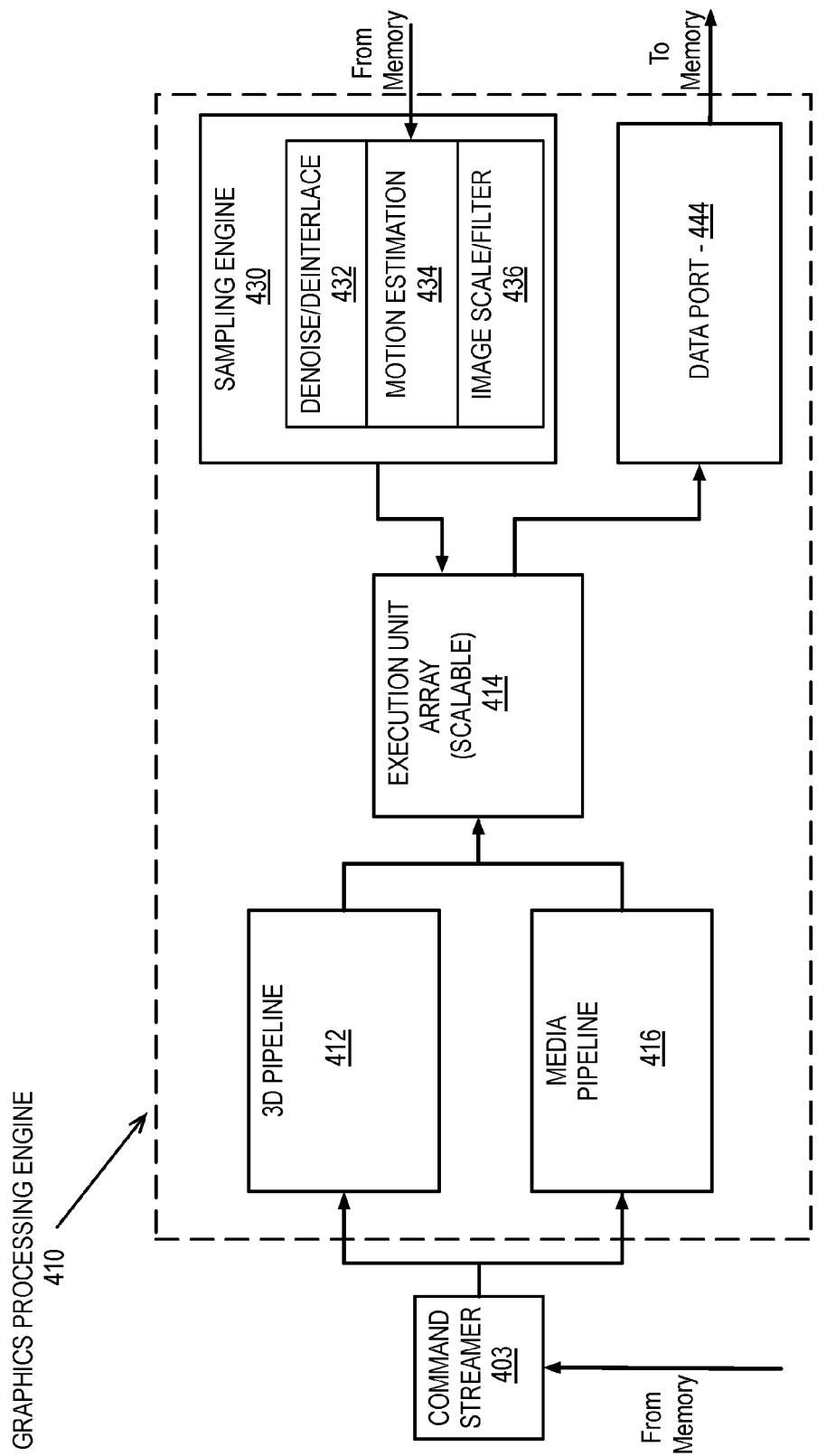
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
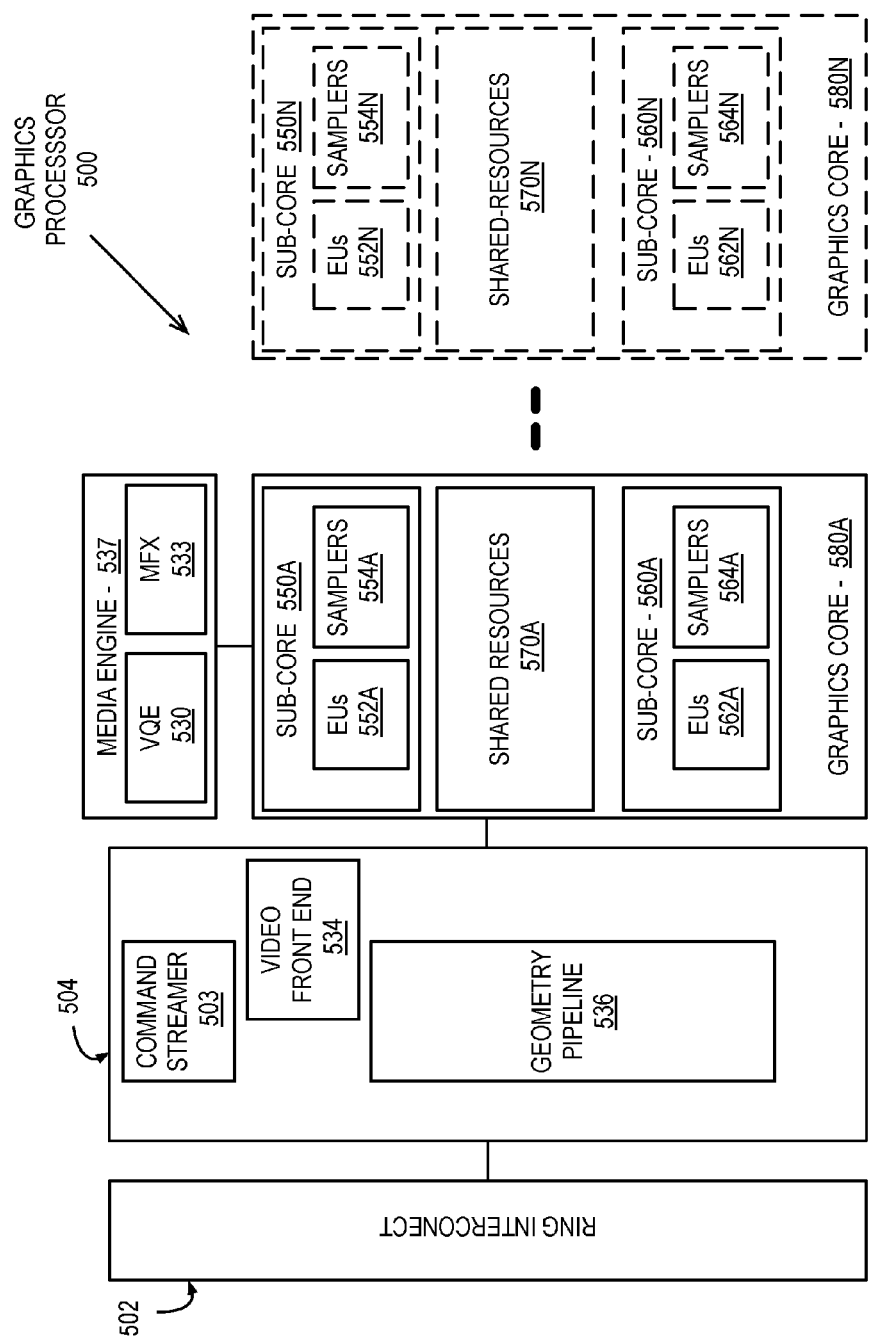
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
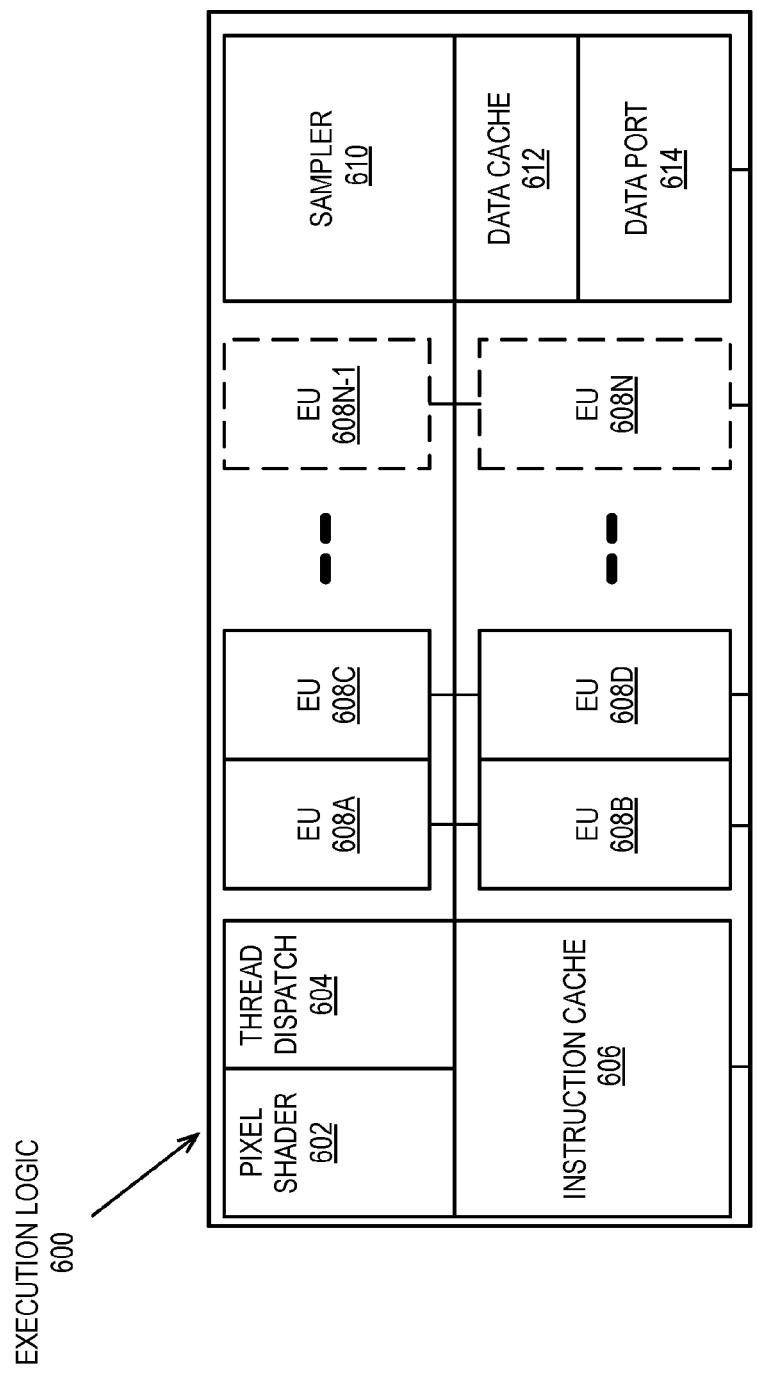
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
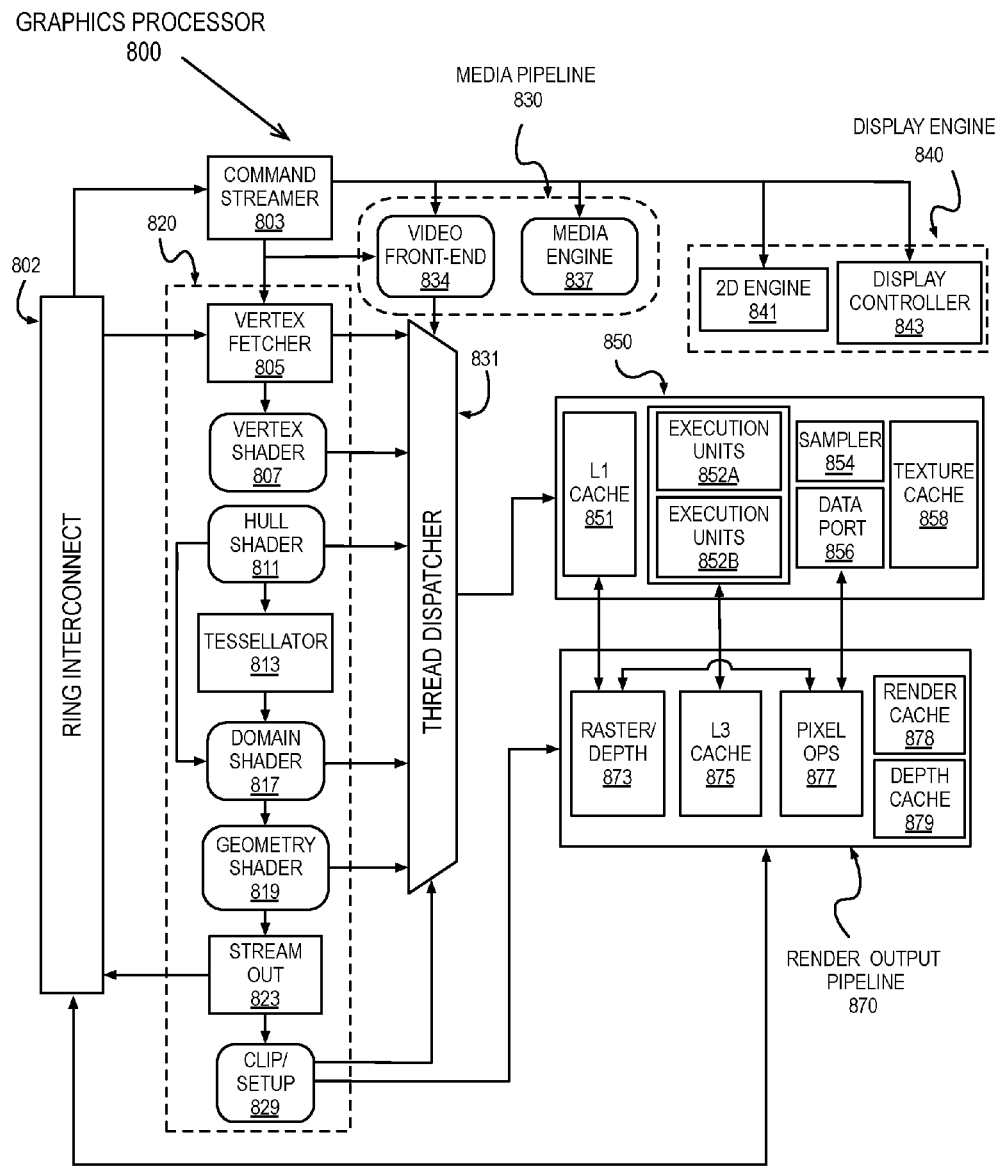
FIG. 8 is a block diagram of another embodiment of a graphics processor which includes a graphics pipeline, a media pipeline, a display engine, thread execution logic, and a render output pipeline.
Figure 9:
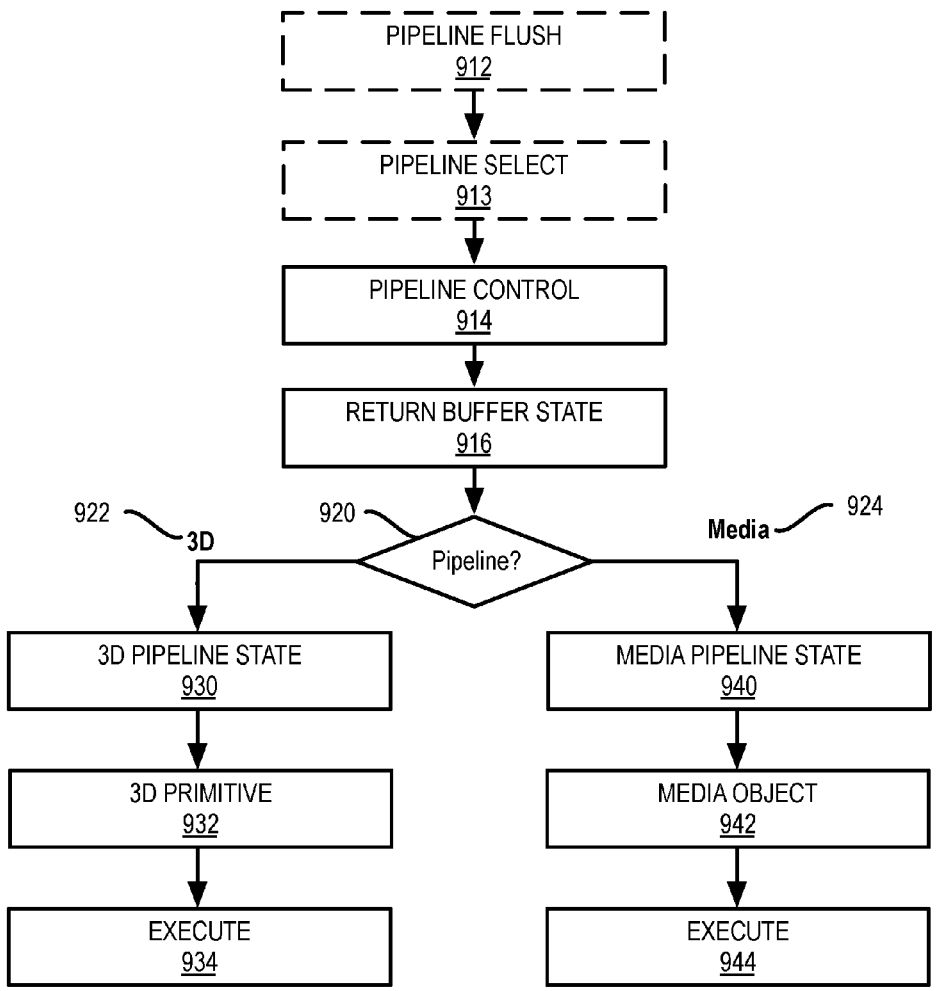
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
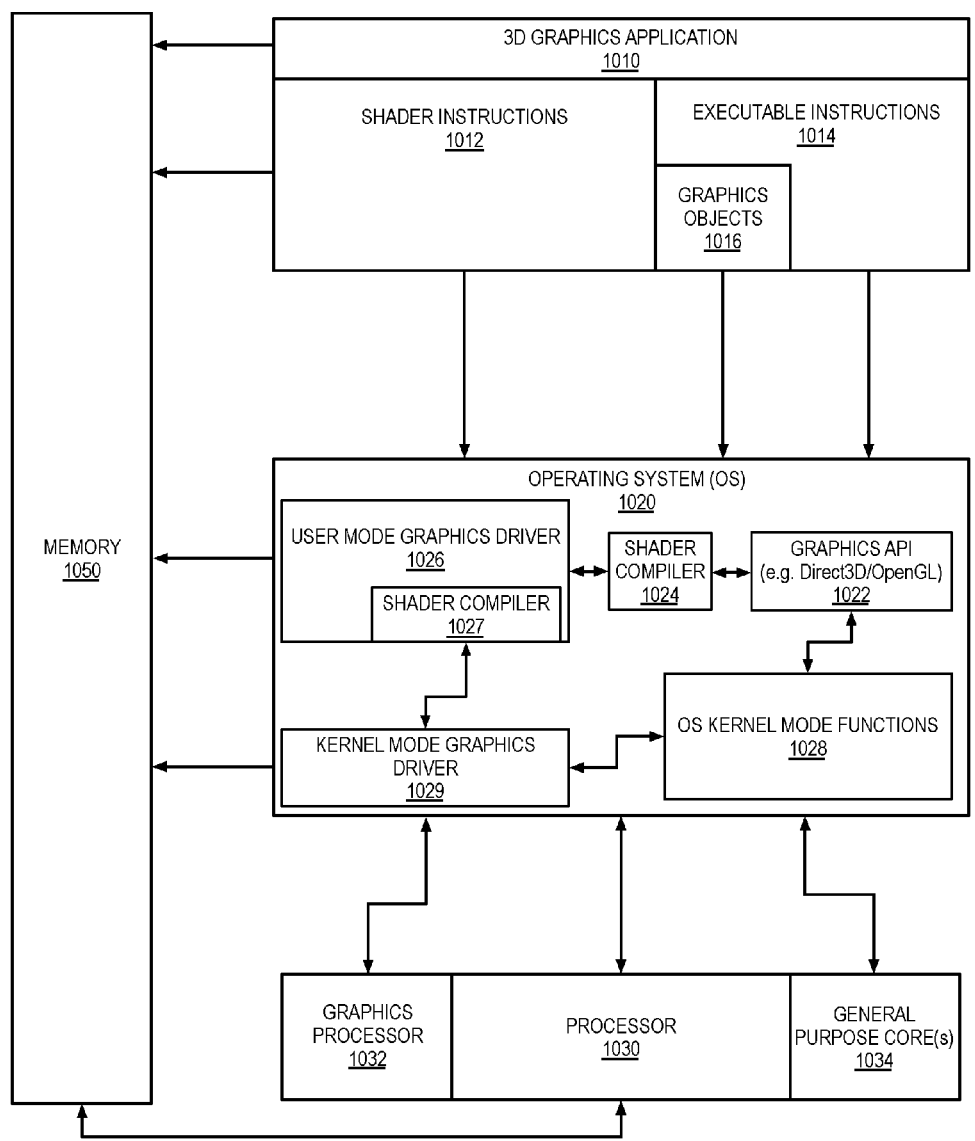
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
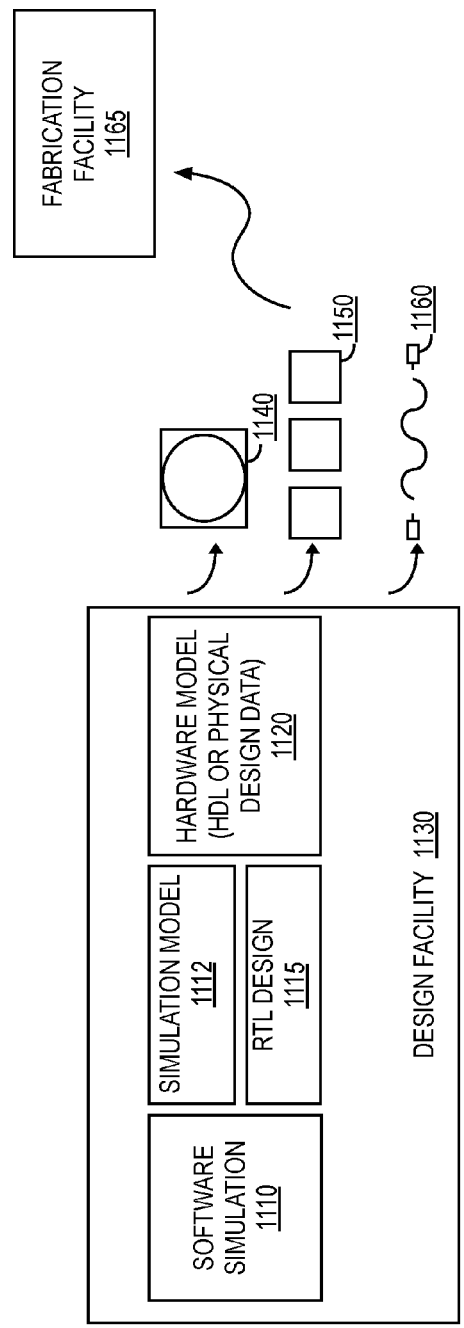
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
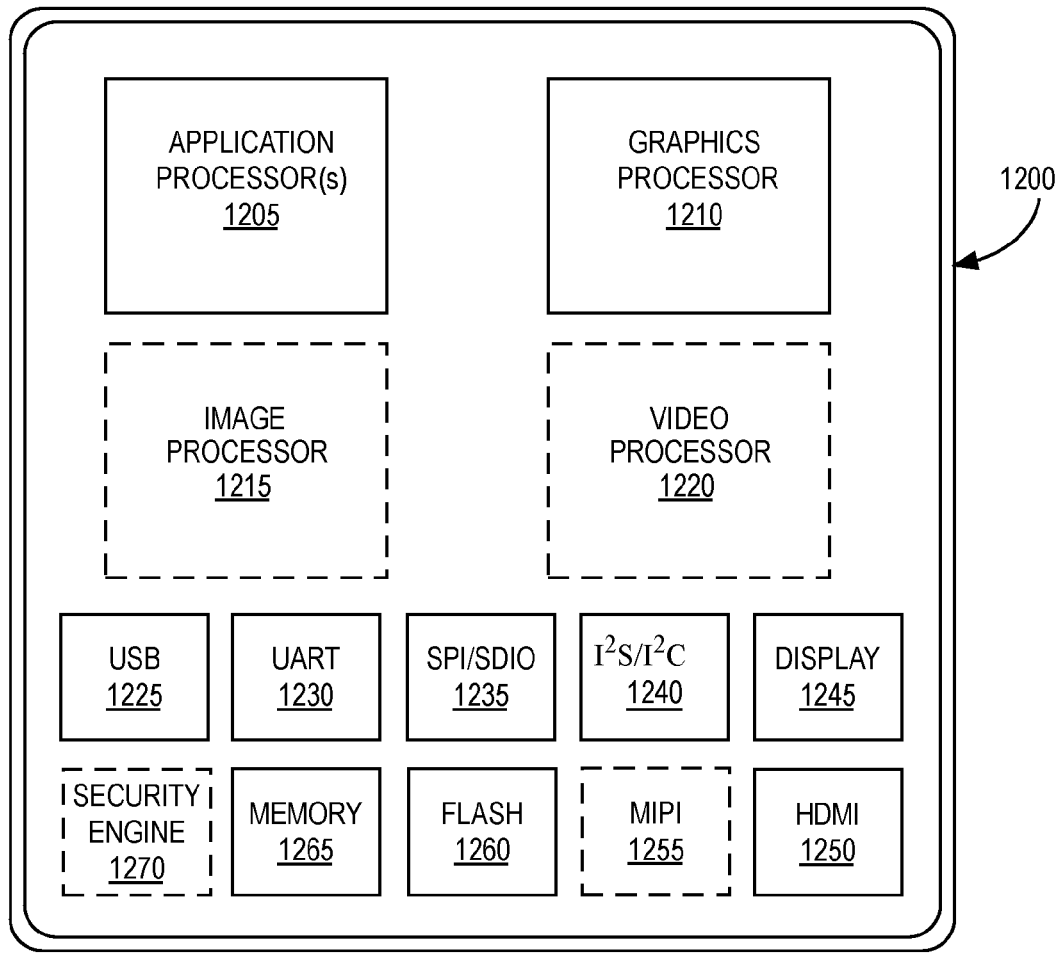
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Method and Apparatus In-Place Construction of Left-Balanced and Complete Point K-D Trees Described herein is a method and apparatus to perform multiple techniques that enable in-place construction of left-balanced complete k-d trees via a sequence of point swapping operations. The in-place construction techniques described herein do not require a copy of the input data and significantly reduce the amount of memory required by computing hardware to execute these techniques. These techniques have large applicability to computer science in general and computational devices employing these methods can realize reduced memory requirements when performing point-based data operations, including database operations, pattern matching operations, and computer graphics operations.

The k-d trees described herein are balanced k-d trees. Balanced k-d trees are k-dimensional search trees of data points in which every node n in the tree passes through a data point P_n, and defines a axis-aligned splitting plane $x\_m=P\_{n,m}$ with a properly chosen dimension m. All nodes n_l in the left sub-tree of node n lie in front (or on) the plane defined by n, all nodes in the right sub-tree lie behind or on that plane. In particular when using left-balanced k-d trees one can use a traditional "heap" organization to encode the tree's topology. In that encoding, the root is stored at location 0, and the two children of node at location N are stored at locations 2*N+1 and 2*N+2, respectively. This encoding can be reached by properly rearranging the input points such that the above k-d tree conditions are fulfilled.

Left-Balanced k-d Tree Construction

Figure 13:
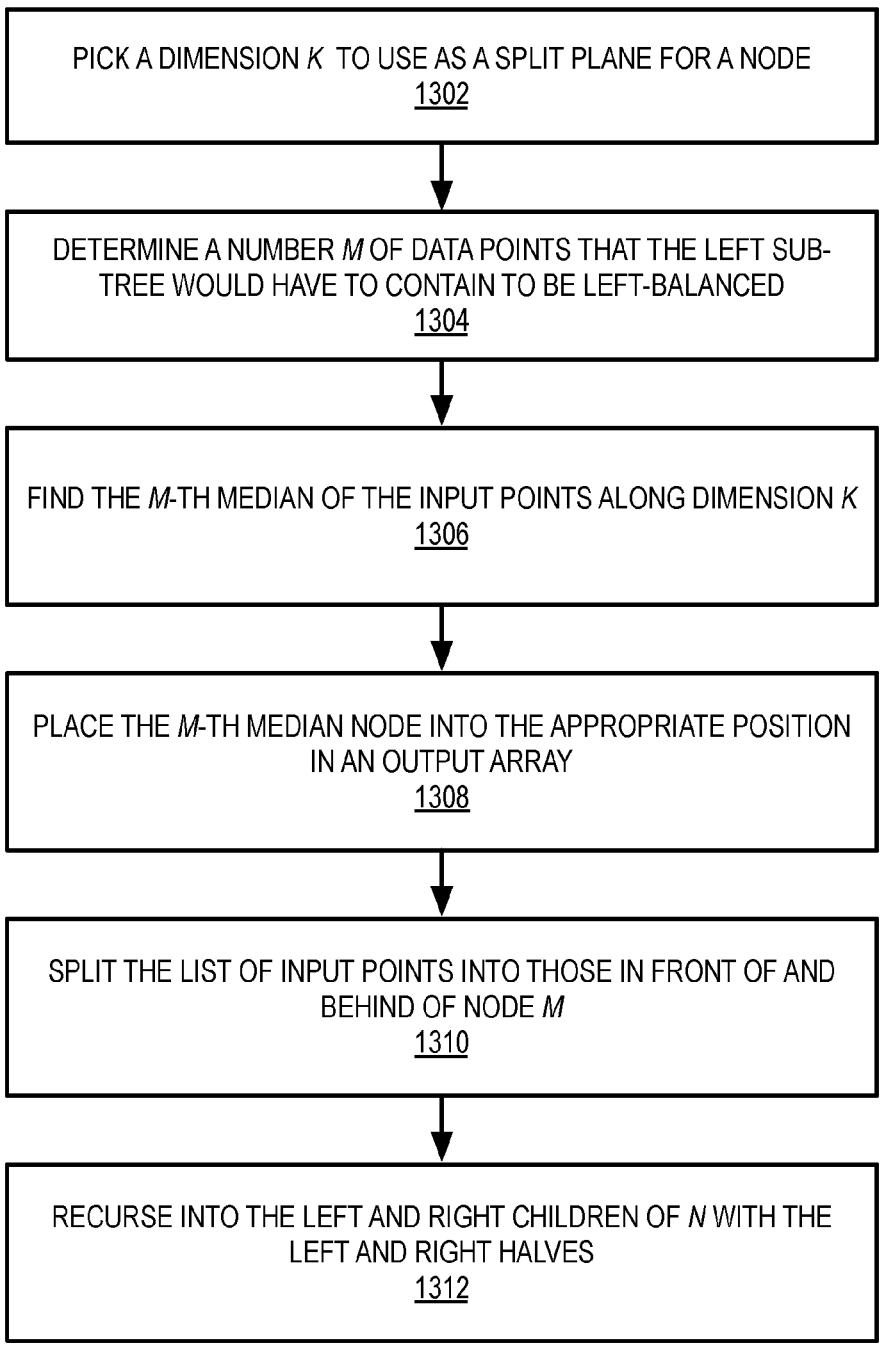
FIG. 13 is a flow diagram of an existing technique left-balanced k-d tree construction.

FIG. 13 is a flow diagram of an existing technique left-balanced k-d tree construction 1300. The operations shown begin at the root of the k-d tree with a list of all input points. Using the list, a node n is processed as shown. Pick a dimension K to use as a split plane for a node, as shown at block 1302. At block 1304, the technique additionally includes to determine a number M of data points that the left sub-tree in a left-balanced and complete tree would have to contain to be left-balanced. The technique additionally includes to find the m-th median of the input points along dimension K. This may be performed using an order O(N) "select" operation or through sorting the list, as shown at block 1306. As shown at block 1308, the technique additionally includes to place the m-th median node into the appropriate position in an output array and, at block 1310, to split the list of input points into those in front of, and behind of, node M. As shown at bock 1312, the technique additionally includes to recurse into left and right children of N with the left and right halves.

While this technique is known in the art, left-balanced K-D tree construction 1300 as described in FIG. 13 requires the use of two arrays, where one array is used to find the median and rearrange the input points and a second array is used for writing the output data. The output cannot be written into the input array because the output is written non-sequentially. When using M-element selection, the method has average complexity of O(N log N). However, dealing with inputs where multiple points are coplanar may be problematic.

Two techniques for constructing left-balanced and complete point K-D trees are described herein that avoid the limitations of existing construction methods. In various embodiments, graphics processors can include logic to perform one or both of heap based in-place construction and linear partitioning in-place construction. These techniques can be incorporated into fixed function logic within a graphics processor or can be performed using programmable graphics processor logic.

Heap Based In-Place Left-Balanced K-D Tree Construction

One method utilizes the heap data structure for a k-d tree, in which the tree is stored linearly in memory, for example, in an array data structure or a linearly addressed memory buffer. In such buffer, the root node of the k-d tree is stored at location zero (e.g., the base address) of an array or buffer and the left and right children of node at location N are stored at locations 2*N+1 and 2*N+2, respectively. Alternatively, the root node may be stored at location one of an array or buffer and the left and right children of a node at location N can be stored at 2*N and 2*N+1. When building a complete point k-d tree at a given node at location N, and having picked a dimension K, heap based in-place point k-d tree construction can be performed as shown in FIGS. 14-15.

Figure 14:
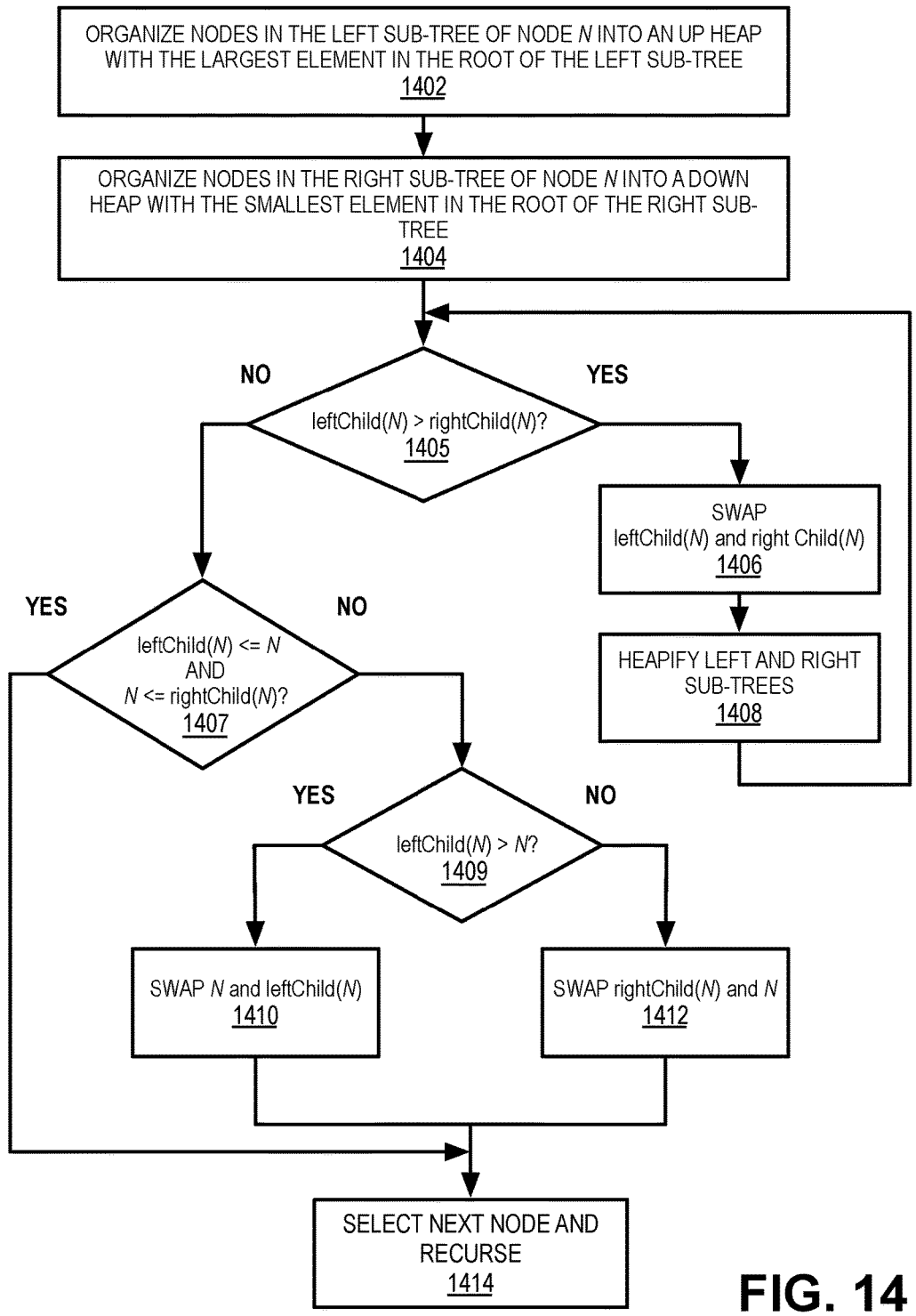
FIG. 14 is a flow diagram illustrating heap based in-place construction logic, according to an embodiment.
Figure 15:
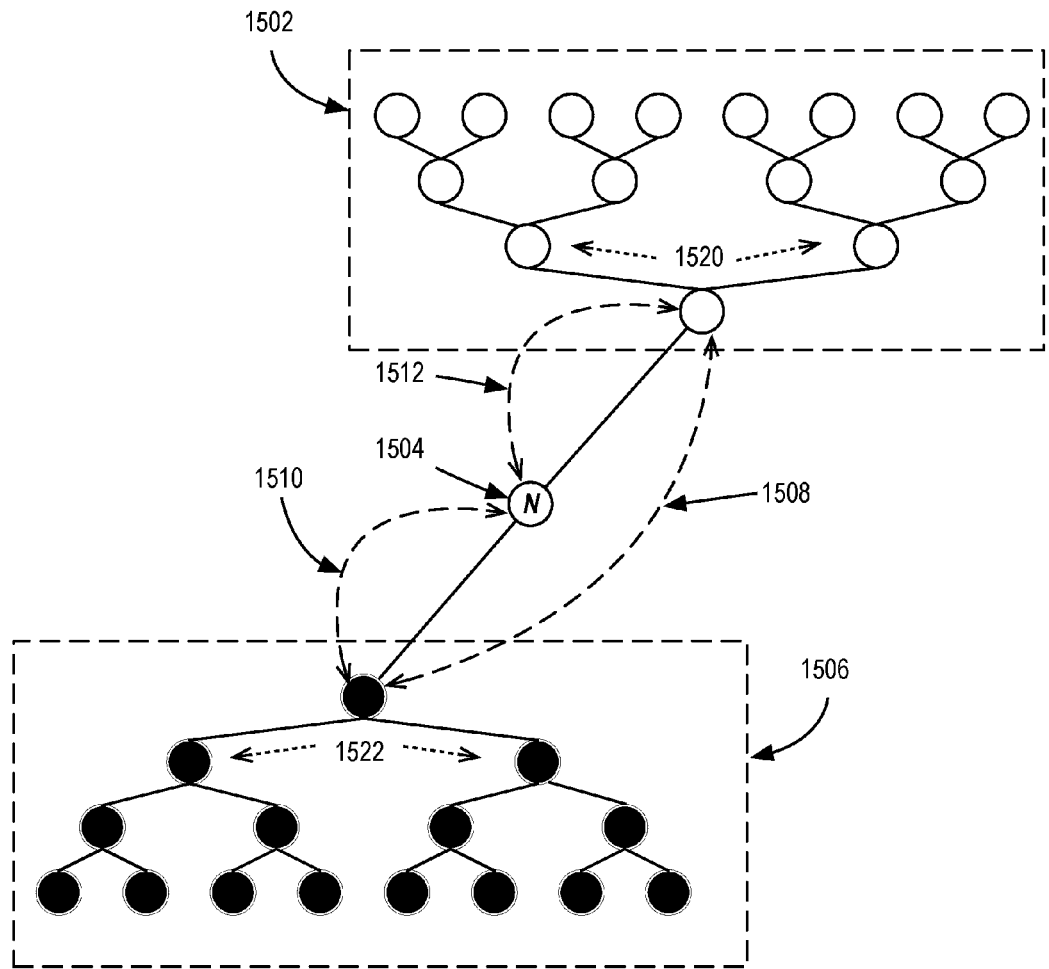
FIG. 15 is an illustration of logical operations associated with heap based in-place construction, according to an embodiment.

FIG. 14 is a flow diagram illustrating heap based in-place k-d tree construction logic 1400, according to an embodiment. The heap based in-place k-d tree construction logic 1400 is configured to generate k-d trees that are left-balanced and complete. One embodiment provides for a graphics processor including the heap based in-place k-d tree construction logic 1400, which can be performed by fixed function graphics processor logic or programmable graphics processor logic, such as shader program logic executed by execution resources of the graphics processor. In one embodiment, at least a portion of the heap based in-place construction logic 1400 can be included within software library provided with the graphics processor or configured to optimize application software that makes use of the graphics processor. Such software library may execute in part on one or more general purpose processor cores coupled to the graphics processor. In one embodiment, the general purpose processor core and the graphics processor are coupled on a single die as a system on a chip integrated circuit.

As shown at block 1402, the heap based in-place construction logic 1400, for a node N, can organize nodes in the left sub-tree of N into an up heap (e.g., a max heap), in which the largest element in the left sub-tree is stored in the root node, which is the left child node of node N. As shown at block 1404, the heap based in-place construction logic 1400 can organize the nodes in the right sub-tree of N into a down heap (e.g., a min heap), in which the smallest element in the right sub-tree is stored at root of the left sub-tree, which is the right child node of node N. The heap building operations at block 1402 and block 1404 can be performed in-place within the array or buffer storing the input data. In one embodiment, the heap building operations at block 1402 and block 1404 can be performed using conventional heap building algorithms.

The heap based in-place construction logic 1400 can then perform a series of in-place node swaps to successively re-arrange the left and right sub-trees of N until the entire heap structure is organized into a left-balanced and complete point k-d tree, without requiring a separate output buffer or array.

As shown at block 1405, an operation is performed to determine if the left child of node N, represented as leftChild(N), is greater than the right child of node N, represented as rightChild(N). If leftChild(N) is greater than rightChild(N), then the heap based in-place construction logic 1400 can perform an operation to swap leftChild(N) and rightChild(N), as shown at block 1406. This swap will break the min heap and max heap property of each sub-tree, as the swapped nodes will not be properly sorted. The heap based in-place construction logic 1400 can then fix each heap by performing a heapify operation on each sub-tree to restore the heap property to each sub-tree at block 1408. The heapify operation can trickle-down or bubble up the swapped root nodes to the appropriate position in each sub-tree. The heap based in-place construction logic 1400 can then return to block 1405 to determine whether leftChild(N) remains greater than rightChild(N). The operations a block 1405-1408 can be iterated as necessary until the left child of N is less than or equal to the right child of N. Once at block 1405 it is determined that leftChild(N) is less than or equal to rightChild(N), it is known that all nodes in the left sub-tree are smaller or equal to any node in the right sub-tree. However, it is not necessarily known how node N relates to either of these nodes.

To resolve this uncertainty, once the leftChild(N) is no longer greater than rightChild(N) at block 1405, the heap based in-place construction logic 1400 proceeds to an operation shown at block 1407 to determine if both leftChild(N) <=N and N<=rightChild(N). If the check at block 1407 is true (e.g., YES), the heap based in-place construction logic 1400 is complete, as the array or buffer will contain a left-balanced and complete point k-d tree.

If at block 1407 either one of leftChild(N)<=N or N<=rightChild(N) is not true, the heap based in-place construction logic 1400 proceeds to block 1409 to determine whether the left child of N (e.g., leftChild(N)) is greater than N. Because leftChild(N), should be less than or equal to N, the heap based in-place construction logic 1400 performs a swap operation to swap N and leftChild(N) at block 1410 to complete the construction of the left-balanced complete point k-d tree. If at block 1409 leftChild(N) is not greater than N, then it is known that N is greater than the right child of N and the heap based in-place construction logic 1400 can perform a swap operation at block 1412 to swap rightChild(N) and N, to complete construction of the left-balanced complete point k-d tree for node N. Subsequently, at block 1414, the heap based in-place k-d tree construction logic 1400 recurses into the left and right sub-trees of node N to continue the in-place construction of the left balanced point k-d tree, until the construction of the point k-d tree is complete, using the logic shown at blocks 1402-1412. Using the heap based in-place k-d tree construction logic 1400 it may be possible to perform the construction of the entire point k-d tree in $O(N \log^2 N)$ efficiency.

FIG. 15 is an illustration 1500 of logical operations associated with heap based in-place k-d tree construction, according to an embodiment. As illustrated, a graphics processor or graphics processing apparatus can select a point within the data point to use a root node (e.g., node N 1504) for use in constructing a point k-d tree from a set of input data points. A right sub-tree 1502 rooted at the right child node of node N 1504 is organized as a down heap (e.g., min heap) in which larger values are stored in the leaf nodes and the smallest value is stored in root node. The left sub-tree 1506 is ordered as an up heap (e.g., max heap) in which smaller values are stored in the leaf nodes and the largest value in the sub-tree is stored in the root node. The right sub-tree 1502 and the left sub-tree 1506 can be constructed using conventional heap building algorithms, as described with respect to block 1402 and block 1404 of FIG. 14.

It will be understood by one skilled in the art that the tree formed by the left sub-tree 1502, node N 1504, and right sub-tree 1506 may itself be a sub-tree of another tree. Additionally, the values of each node are the m-th coordinates of a k-dimensional point. However, as each node is indexed based on one given, pre-chosen dimension m, only the index values are relevant. In one embodiment, additional logic is included to automatically select the appropriate index coordinate for each node of the k-d tree, as the splitting plane and associated index coordinate may change per level or, in some implementations, every node. In one embodiment, the splitting plane can be determined and stored on a per-node basis.

As described with respect to block 1406 and block 1408 of FIG. 14, several iterations of a swap operation 1510 between the root nodes of the right sub-tree 1502 and left sub-tree 1506 are performed. After each swap operation 1510 is performed the heap relation of the respective sub-trees is repaired using a heapify down 1520 (e.g., trickle down) operation for the left sub-tree and a heapify up 1522 (e.g., bubble up) operation. In one embodiment, conventional heap building and/or repair operations may be used. Once the node relationships for the respective sub-trees are correct, an additional swap operation can be performed, which will be a swap operation 1510 on the root node of the left sub-tree 1502 and node N 1504, as described with respect to block 1410 of FIG. 14, or a swap operation 1512 on the root node of the right sub-tree 1502 and node N 1504, as described with respect to block 1412 of FIG. 14. One of either swap operation 1510 or swap operation 1512 will complete the k-d tree construction operations for node N. Subsequently, heap based in-place k-d tree construction logic recurses into the left and right sub-trees of node N to continue the in-place construction of the left balanced point k-d tree, until the construction of the point k-d tree is complete. In one embodiment, one or more operations described herein may be performed in parallel, including the initial heap building operations, the heapify operations on the left and right sub-trees, and the subsequent recursion into the left and right subtrees. The parallel operations can be multi-core or multi-processor parallel operations or can be vector operations performed by a processor including SIMD or vector processing logic.

Linear Partitioning Based In-Place Left-Balanced K-D Tree Construction

One embodiment provides for a graphics processing apparatus including logic to perform an additional method of in-place construction of a left-balanced complete point k-d tree for a collection of k-dimensional points, where the additional method makes use of a linear partitioning operation. The linear portioning based k-d tree construction method, in some implementations, may provide improved performance relative to the heap based method described with respect to FIGS. 14-15.

Figure 16:
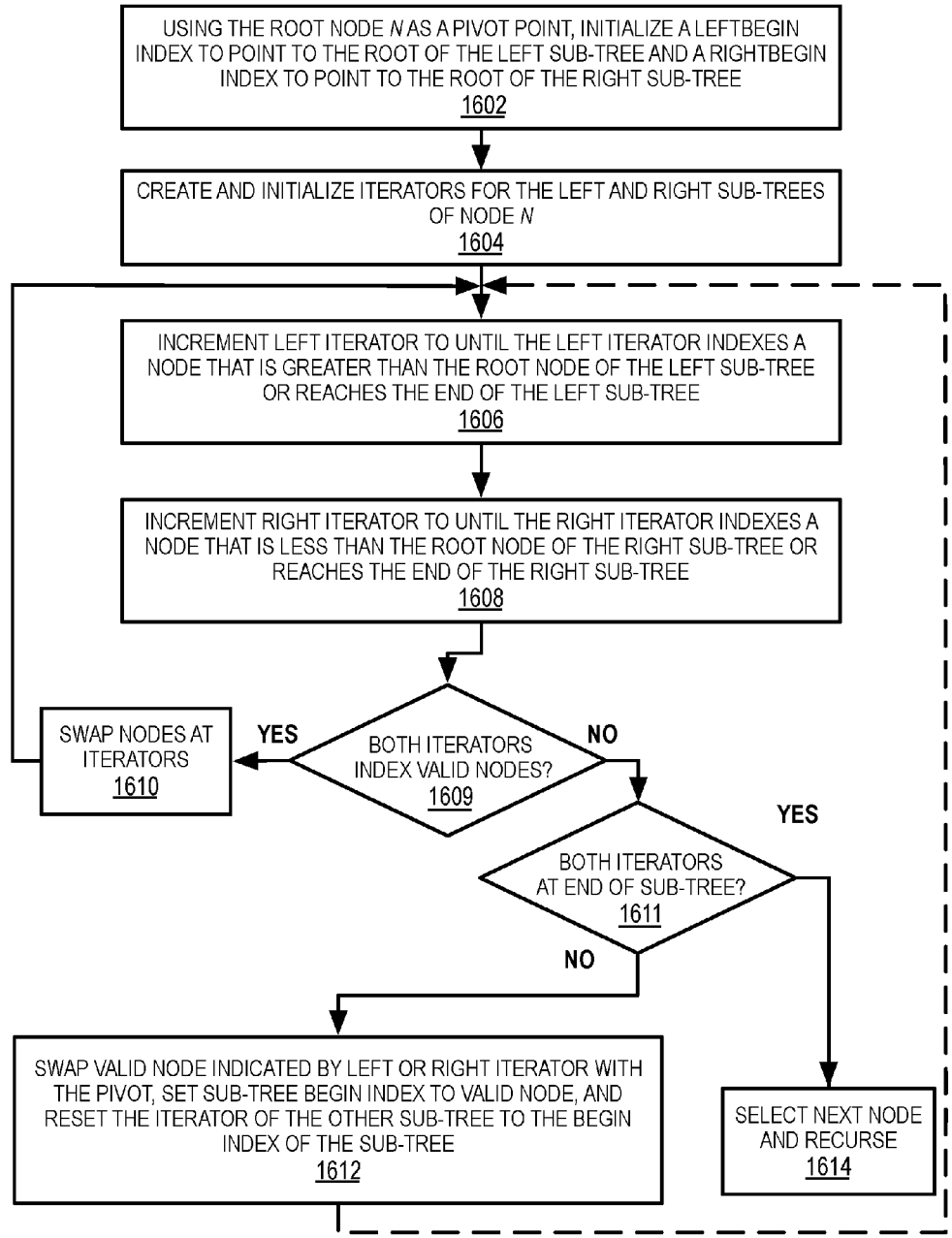
FIG. 16 is a flow diagram illustrating linear partitioning based in-place construction logic, according to an embodiment.

FIG. 16 is a flow diagram of linear partitioning based in-place k-d tree construction logic 1600, according to an embodiment. The linear partitioning based in-place k-d tree construction logic 1600 is configured to generate k-d trees that are left-balanced and complete. One embodiment provides for a graphics processor including the linear partitioning based in-place k-d tree construction logic 1600, which can be performed by fixed function graphics processor logic or programmable graphics processor logic, such as shader program logic executed by execution resources of the graphics processor. In one embodiment, at least a portion of the logic can be included within software library provided with the graphics processor or configured to optimize application software that makes use of the graphics processor. Such software library may execute in part on one or more general purpose processor cores coupled to the graphics processor. In one embodiment, the general purpose processor core and the graphics processor are coupled on a single die as a system on a chip integrated circuit.

The operations of the linear partitioning in-place k-d tree construction logic 1600 use the root node N of a given sub-tree as an arbitrary pivot point. The sub-tree in question is any given set of k-dimensional points in an input buffer or array that will be used to construct the left-balanced complete point k-d tree, where the root node N has a left sub-tree in which the root node of the left sub-tree is the left child node of node N and a right sub-tree in which the root node is the right child of node N.

In one embodiment, the linear partitioning based k-d tree construction logic 1600 uses two iterators, one iterator counting upwards from the left of the input points and one iterator counting downwards from the right, to find pairs of points to be swapped to ensure that all points on the left are smaller than the points on the right. When the iterators iterate through each of the left and right sub-trees, the iterators can swap values between nodes within the sub-trees when each iterator locates a node that should belong to the other sub-tree. Additionally, a pair of indices for each sub-tree, a leftbegin index for the left sub-tree and a rightbegin index for the right sub-tree, are used to indicate a set of fixed nodes, such that the set of nodes between each index and the root of each sub-tree is guaranteed to belong to the respective subtrees. The leftbegin and rightbegin indices are used to store the state information for the left and right iterators, such that on successive iterations through each sub-tree during partitioning operations for a given node N, the left and right iterators may be reset to the leftbegin and right begin indices instead of the root node for each sub-tree. As shown at block 1602, the linear partitioning based in-place k-d tree construction logic 1600, initializes a leftbegin index to point to the root of the left sub-tree and a rightbegin index to point to the root of the right sub-tree, using the root node N of the given sub-tree as a pivot point. As shown at block 1604, the logic can further create and initialize iterators for the left and right sub-trees of node N, which are the sub-trees having the left and right child nodes of node N as root nodes.

There are no logical equivalents of 'upwards from the left' and 'downwards from the right' tree traversal methods for a heap organization. Accordingly, for the linear partitioning based in-place k-d tree construction logic 1600, specially defined iterator logic is used for the iterators of each sub-tree to enable the logic to iterate through each elements of a given node's sub-tree. Pseudo-code for the sub-tree iterator is shown in Table 1.

TABLE 1

Sub-tree Iterator

```
Struct SubtreeIterator {
        int root, current, numInLevel, currentInLevel;
        void init(int rootNode) {
                root = rootNode;
                current=root;
                numInLevel=1;
                currentInLevel=0;
        }
        void next( ) {
                ++current;
                ++currentInLevel;
                if (currentInLevel==numInLevel) {
                        current = 2*(current−currentInLevel)+1;
                        numInLevel*=2;
                        currentInLevel=0;
                }
        }
}
```

The sub-tree iterator of Table 1 includes initialization logic (e.g., init) and iteration logic (e.g., next), where the iteration performed on a sub-tree is breadth-first.

As shown at block 1606, the linear partitioning based k-d tree construction logic 1600 increments the left iterator (e.g., using the subtreeiterator next( ) routine) until the left iterator iterates a node that is greater than the root node of the left sub-tree or the iterator reaches the end of the left sub-tree. At block 1608, the logic increments the right iterator until the right iterator iterates to a node that is less than the root node of the left sub-tree or the iterator reaches the end of the right sub-tree. At block 1609 the logic determines whether both iterators has iterated to and currently select valid nodes, which means that the iterators have not reached the end of their respective sub-trees. If both the left iterator and the right iterator point to or indicate valid nodes at block 1609, the logic can perform a swap operation to swap the nodes indicated by the left and right iterators by swapping the data values of the nodes. The logic then returns to block 1606 and the operations at block 1606 through block 1610 continue until either the left or right iterator reaches the end of the respective sub-trees and no longer points to or indicates a valid node.

If at block 1609 it is determined that both iterators do not point to or indicate valid nodes (e.g., that at least one iterator has reached the end of a sub-tree), the logic can determine at block 1611 if both iterators have reached the end of their respective sub-trees. If either the left or right iterator points to or indicates to a valid node, the logic can proceed to block 1612 to swap the valid node indicated by the left or right iterator with the pivot node (e.g., node N). The logic can then set the sub-tree begin index for the sub-tree with the valid node to point to or otherwise indicate the position of the valid node in the array or buffer. The logic also resets the iterator for the other sub-tree (e.g., the sub-tree having the iterator that does not indicate a valid node) to the node indicated by the begin index (e.g., leftbegin, rightbegin) of that sub-tree. After swapping the pivot at block 1612, the logic returns to block 1606 and operations continue until both iterators reach the end of their respective sub-trees at block 1611. The swap and reset operations described are illustrated in FIG. 17A-C, which are described below.

If both iterators have reached the end of their respective sub-trees at block 1611, a left-balanced and complete point k-d tree construction is complete for node N, and the linear partitioning based k-d tree construction logic 1600 can recurse into the left and right sub-trees of node N, as shown at block 1614, until construction of the point k-d tree is complete for the entire array or buffer. Some implementations of the linear partitioning based in-place k-d tree construction logic 1600 may approach an average case complexity of O(N log N). Experimental evidence suggests that, in some implementations may be faster than the heap based in-place construction logic 1400 of FIG. 14 on some workloads.

Figure 17A:
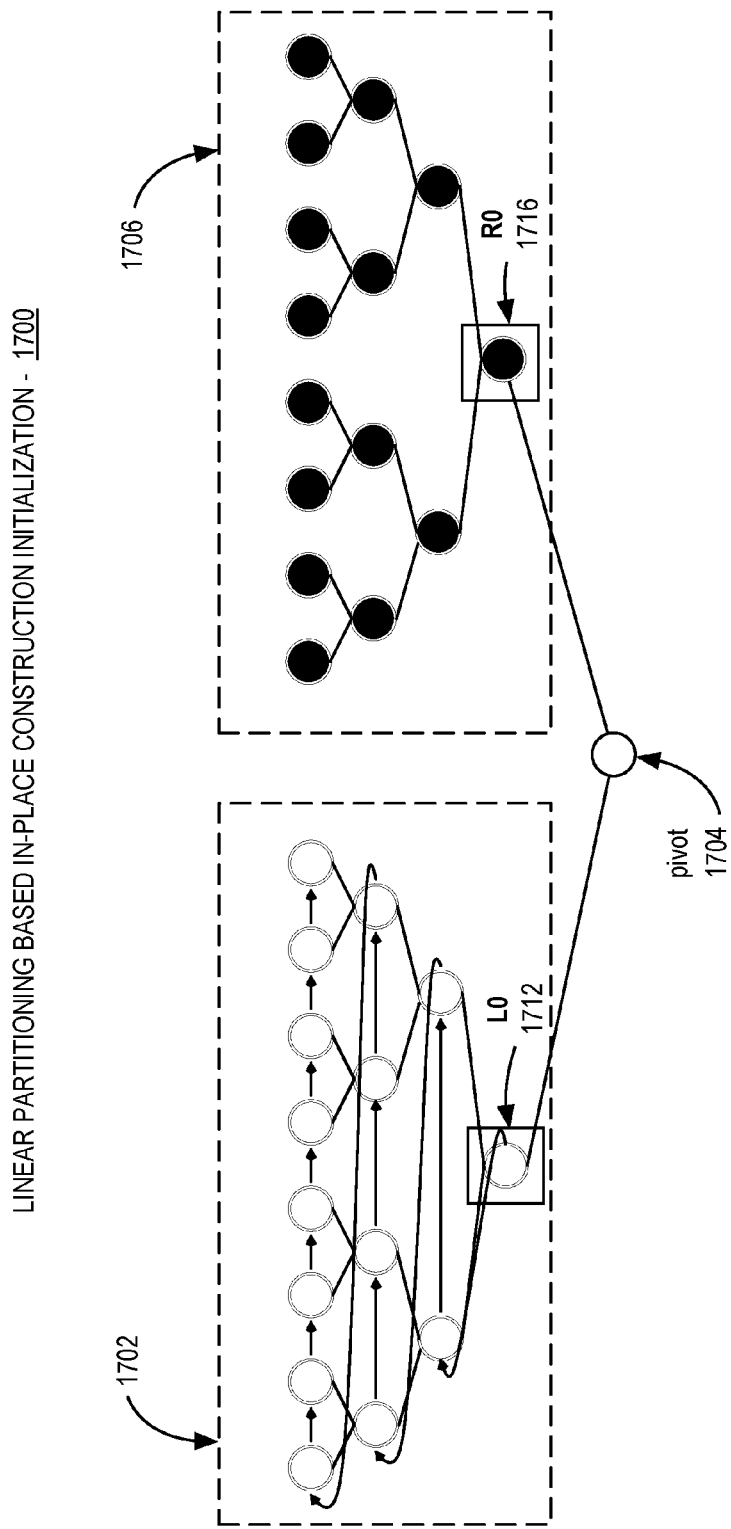
FIGS. 17A-C are illustrations of logical operations associated with linear partitioning based in-place construction, according to an embodiment.
Figure 17B:
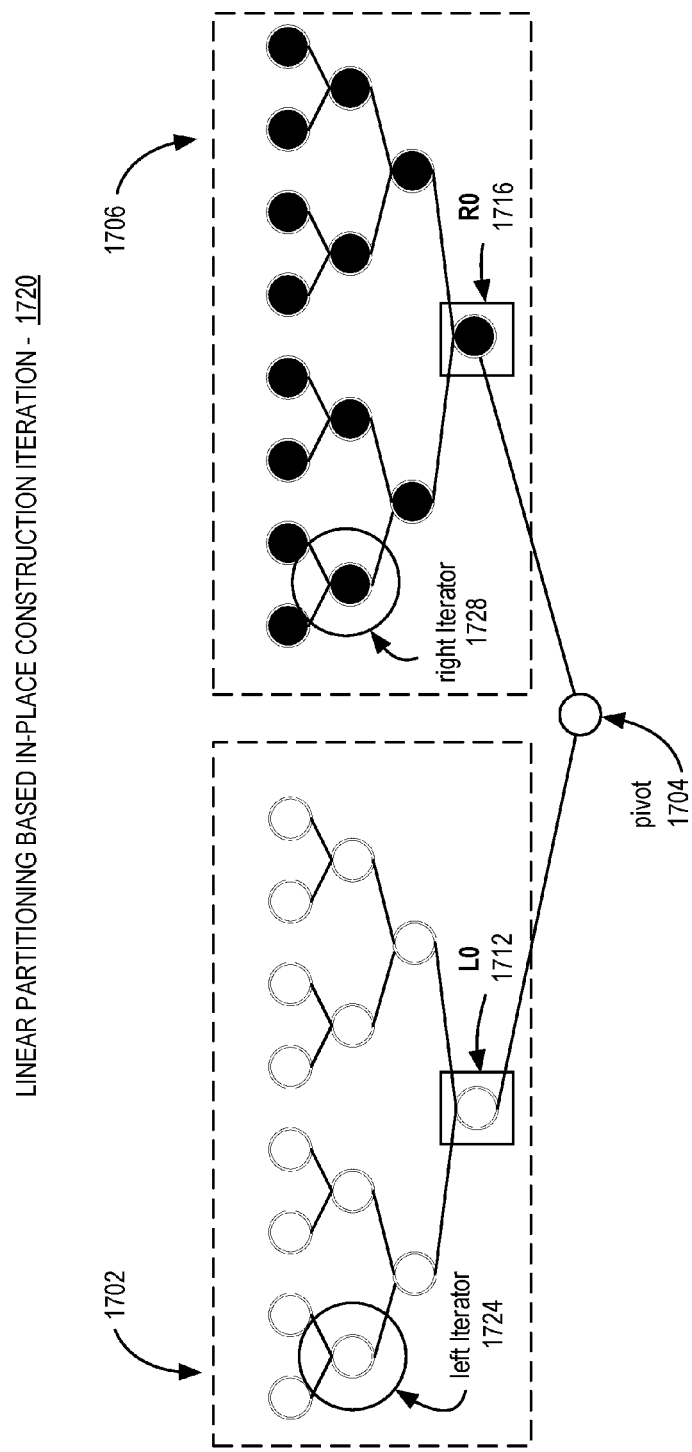
Figure 17C:
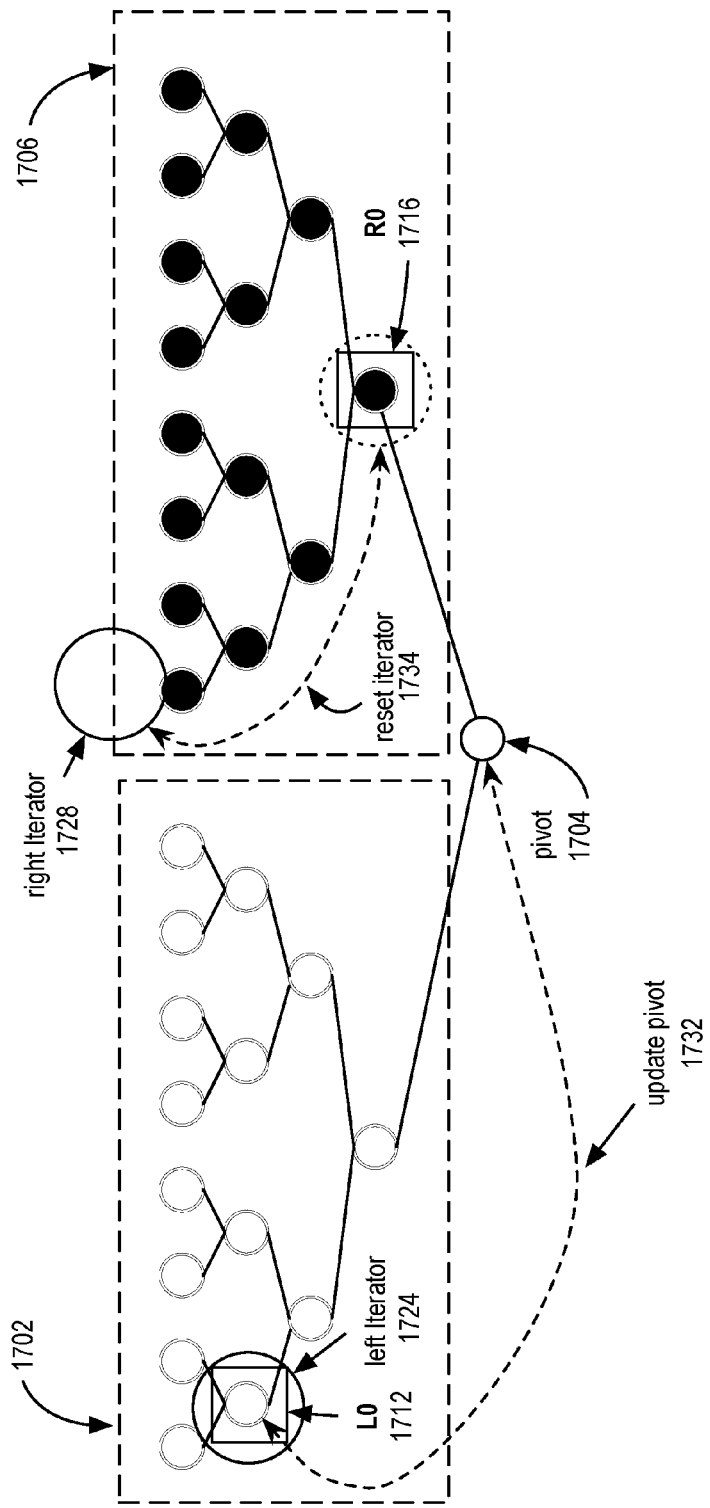

FIGS. 17A-C are illustrations of logical operations associated with linear partitioning based in-place construction, according to an embodiment. FIG. 17A illustrates an initial condition for linear portioning based in-place construction initialization 1700. FIG. 17B illustrates linear partitioning based in place construction iteration 1720. FIG. 17C illustrates linear partitioning fixed node determination 1730.

As shown in FIG. 17A, linear partitioning based in-place construction 1700 of a left-balanced and complete point k-d tree, in one embodiment, utilizes two sub-trees, a left sub-tree 1702 and a right sub-tree 1706, from an arbitrary pivot node 1704. In one embodiment the value associated with the pivot node 1704, at initialization, is whatever value happens to occupy the root node position of the tree created by the left sub-tree 1702 and the right sub-tree 1706 and may be replaced during processing. Iteration through each sub-tree can be performed in a breadth-first manner using the sub-tree iterator logic shown in Table 1.

The left sub-tree 1702 and the right sub-tree 1706 can begin with random input values and pre-sorting is not required. The goal of the linear partitioning is to arrange the sub-trees such that all nodes in the left sub-tree 1702 have values that are less than or equal to the value at the pivot node 1704, while all nodes in the right sub-tree 1706 have values that are greater than or equal to the value at the pivot node 1704. It will be understood by one skilled in the art that the tree formed by the left sub-tree 1702, pivot node 1704, and right sub-tree 1706 may itself be a sub-tree of another tree. Additionally, the node values are the m-th coordinates of a k-dimensional point. However, as each partitioning operation only operates on one given, pre-chosen dimension m, only the values used for each partitioning are relevant. In one embodiment, additional logic is included to automatically select the appropriate index coordinate for each node of the k-d tree, as the splitting plane and associated index coordinate may change per level or per node.

Iteration is performed through each sub-tree to determine a matching and non-matching status of nodes with respect to the current pivot node 1704, where a matching node in the left sub-tree 1702 is less than the pivot node 1704 and a matching node in the right sub-tree 1706 is greater than the pivot node 1704. As the pivot node 1704 is chosen randomly, not all nodes of each sub-tree will fulfill the k-d tree conditions. The linear partitioning based in-place construction algorithm can successively pick various pivot candidates and successively swaps non-matching nodes with respect to a given pivot until the k-d tree condition is fulfilled for the entire tree. Accordingly, during construction, two pivots are relevant, the current pivot (e.g., pivot node 1704), with which the algorithm operates, and the true pivot, which will be discovered during construction During initialization, a leftbegin index L0 1712 is initialized to point to the root node of the left sub-tree. A rightbegin index R0 1716 is initialized to point to the root node of the right sub-tree. These indexes indicate guaranteed left sub-tree nodes and guaranteed right sub-tree nodes that are discovered during construction, as even though the true pivot is not initially known, it can be determined that some nodes are certain to ultimately belong in the left sub-tree 1702 or the right sub-tree 1706. Tracking such nodes successively reduces the set of candidates for the true pivot. When L0 1712 points to a node in the left sub-tree, it is known that all nodes between the L0 and the root of the left sub-tree 1702 are known to be final, while nodes between L0 and the end of the left sub-tree are still under consideration. The same conditions apply for R0 1716 and the right sub-tree 1706. As no certainty can be asserted initially, L0 1712 and R0 1716 are initialized to point to the root of their respective sub-trees.

As shown in FIG. 17B, the sub-tree iterator logic can iterate through each sub-tree using a left iterator 1724 and a right iterator 1728, using iteration logic such as the sub-tree iterator of Table 1. Given a current pivot node 1704 and given set of fixed (e.g., guaranteed) nodes indicated by the position of L0 1712 and R0 1716, the logic can successively iterate through each sub-tree to find a mismatched node, which is a node that belongs to the other sub-tree based on the current pivot node 1704, as described with respect to block 1606 through block 1610 of FIG. 16. The swapping continues until the logic completes construction of the k-d tree or determines definitively that the current pivot node 1704 is incorrect, for example, as described with respect to block 1611 of FIG. 16.

As shown in FIG. 17C and described with respect to block 1612 of FIG. 16, linear partitioning fixed node determination 1730 can be performed once one, but not both of the left iterator 1724 or right iterator 1728 reaches the end of their respective sub-tree. For example, the right iterator 1728 is illustrated as reaching the end of the right sub-tree 1706, or has otherwise reached a boundary defining the end of valid data for the sub-tree, while the left iterator 1724 indicates a mismatched node to swap. At this point, an update pivot operation 1732 is performed in which the node indexed by the left iterator 1724 is swapped with the current pivot node 1704 and the L0 1712 index is updated to point to the swapped node. The update of the L0 1712 index indicates that nodes in the left sub-tree between L0 1712 index and the root of the left sub-tree 1702 are fixed nodes and will no longer be checked during subsequent iterations through the sub-tree. When a sub-tree iterator reaches the end of a sub-tree, the iterator is reset to the begin index of the subtree. As illustrated, the right iterator 1728 has iterated to the end of the right sub-tree and a reset iterator operation 1734 is performed to reset the right iterator 1728 to the R0 index 1716. Iterative swapping continues in which the left iterator 1724 begins iterating from the L0 1712 index and the right iterator 1728 begins iterating from the R0 1716 index.

Operations for node N (e.g., pivot 1704) are complete which, as shown at block 1611 in FIG. 16, both iterator reach the end of their respective sub-trees, and the logic can continue constructing the k-d trees via recursion into the left sub-tree 1702 and right sub-trees 1706 to perform the illustrated operations until the entire buffer or array is re-positioned into a left-balanced and complete point k-d tree. It will be understood that the specific operations shown are exemplary, and the specific nodes upon which swap operations are performed is determined by the values contained within each node.

In one embodiment, one or more operations described herein may be performed in parallel, including the left and right sub-tree iteration and the subsequent recursion into the left and right sub-trees of node N. The parallel operations can be multi-core or multi-processor parallel operations or can be SIMD or vector operations performed by SIMD or vector processing logic.

Figure 18:
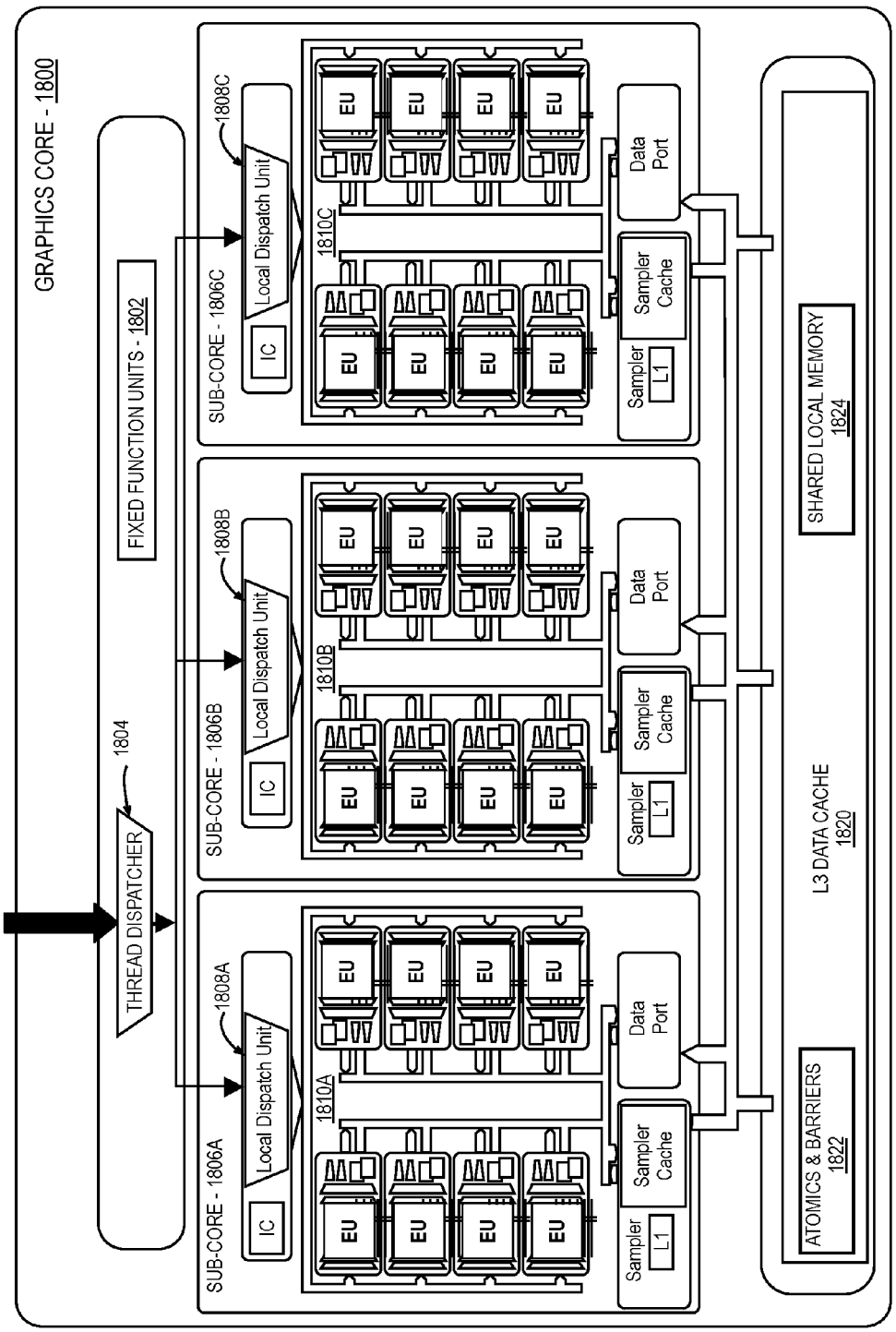
FIG. 18 is a block diagram of graphics core logic that is configurable to perform in-place left-balanced k-d tree construction, according to embodiments described herein.

FIG. 18 is a block diagram of graphics core logic that is configurable to perform in-place left-balanced k-d tree construction, according to embodiments described herein. In one embodiment the graphics core 1800 (e.g., slice) includes a cluster of sub-cores 1806A-C, which may be variants of the sub-cores 550A-N. In one embodiment the graphics core includes a set of fixed function units 1802 that can include at least a portion of the k-d tree construction logic described herein. The graphics core 1800 also includes programmable execution resources that can be configured to execute logic described herein, including shader program instructions provided by one or more graphics or compute shaders. For programmable graphics and computational processing, a thread dispatcher 1804 can dispatch execution threads to the various sub-cores 1806A-C, where a local dispatch unit 1808A-C dispatches execution threads to the execution unit groups 1810A-C in each of the sub-cores 1806A-C. The number of execution units in each of the groups 1810A-C can vary among embodiments. Execution units within each group 1810A-C can also be dynamically enabled or disabled based on workload, power, or thermal conditions.

In one embodiment, each execution unit in the graphic execution unit groups 1810A-C includes instruction fetch logic, an array of general register files, an array of architectural register files, a thread arbiter, a send unit, a branch unit, and a set of SIMD floating point units (FPUs). Multiple simultaneous hardware threads may be active in each execution unit, with the execution state of each thread, including the instruction pointers for each thread, held in thread-specific registers in the architectural register files. The instruction fetch logic can be used to fetch instructions provided by the graphics core 1800 to perform one or more of the k-d tree construction techniques described herein.

In one embodiment, a level-3 (L3) data cache 1820 is shared between each of the sub-cores 1806A-C. In one embodiment the L3 data cache 1820 additionally includes an atomics & barriers unit 1822 and shared local memory 1824. In one embodiment the atomics & barriers unit 1822 includes dedicated logic to support implementation of barriers across groups of threads. The atomics & barriers unit 1822 is available as a hardware alternative to pure compiler based barrier implementation. Additionally, the atomics & barriers unit 1822 enables a suite of atomic read-modify-write memory operations to the L3 data cache 1820 or to the shared local memory 1824. Atomic operations to global memory can be supported via the L3 data cache 1820.

In one embodiment, the shared local memory 1824 supports programmer managed data for sharing amongst hardware threads, with access latency similar to the access latency to the L3 data cache 1820. In one embodiment, the shared local memory 1824 sharing is limited to between threads within the same sub-core 1806A-C, however, not all embodiments share such limitation. Constructs such as the local memory space in OpenCL or DirectX Compute Shader shared memory space can be shared across a single work-group (e.g., thread-group). For software kernel instances that use shared local memory, driver runtimes typically map all instances within a given work-group to an execution unit thread within a sub-core 1806A-C. Accordingly, all kernel instances within a work-group can share access to the same partition within the shared local memory 1824. In such embodiment, an application's accesses to shared local memory can scale with the number of sub-cores 1806A-C. Such work-groups can perform parallel computational operations for point k-d tree building as described herein.

Figure 19:
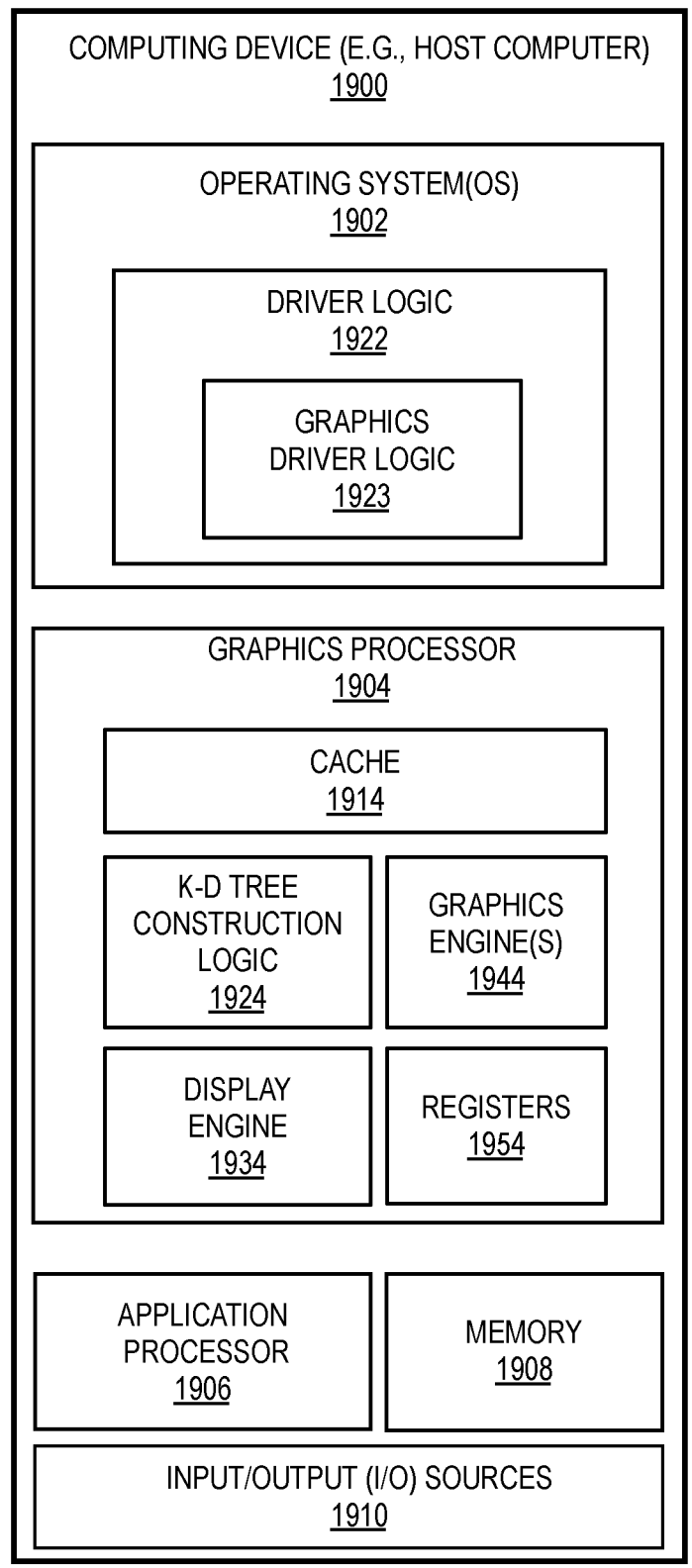
FIG. 19 is a block diagram of a computing device including a graphics processor, according to an embodiment.

FIG. 19 is a block diagram of a computing device 1900 including a graphics processor 1904, according to an embodiment. The computing device 1900 can be a computing device such as the data processing system 100 as in of FIG. 1. The computing device 1900 may also be or be included within a communication device such as a set-top box (e.g., Internet-based cable television set-top boxes, etc.), global positioning system (GPS)-based devices, etc. The computing device 1900 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1900 includes a mobile computing device employing an integrated circuit ("IC"), such as system on a chip ("SoC" or "SOC"), integrating various hardware and/or software components of computing device 1900 on a single chip.

The computing device 1900 includes a graphics processor 1904, which may be any graphics processor described herein. The graphics processor 1904 includes k-d tree construction logic 1924, which may include one or more of the techniques for in-place construction of left-balanced and complete K-D trees described herein. The graphics processor also includes one or more graphics engine(s) 1944, which may include one or more instances of the graphics core 1800 of FIG. 18, or any graphics execution logic described herein, such as the execution logic 600 of FIG. 6. The graphics engine(s) 1944 include execution resources which may work in conjunction with the k-d tree construction logic 1924. The graphics processor 1904 also includes a set of registers 1954, including control registers to configure and control operations for the graphics processor 1904. The graphics processor 1904 also includes a display engine 1934 to couple the graphics processor to a display device. Data that is processed by the graphics processor 1904 is stored in a buffer within a hardware graphics pipeline and state information is stored in memory 1908. The resulting image is then transferred to a display controller of the display engine 1934 for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 1904, the computing device 1900 may further include any number and type of hardware components and/or software components, such as (but not limited to) an application processor 1906, memory 1908, and input/output (I/O) sources 1910. The application processor 1906 can interact with a hardware graphics pipeline, as illustrated with reference to FIG. 3, to share graphics pipeline functionality. The application processor 1906 can include one or processors, such as processor(s) 102 of FIG. 1, and may be the central processing unit (CPU) that is used at least in part to execute an operating system (OS) 1902 for the computing device 1900. The OS 1902 can serve as an interface between hardware and/or physical resources of the computer device 1900 and a user. The OS 1902 can include driver logic 1922 for various hardware devices in the computing device 1900. The driver logic 1922 can include graphics driver logic 1923 such as the user mode graphics driver 1026 and/or kernel mode graphics driver 1029 of FIG. 10.

It is contemplated that in some embodiments, the graphics processor 1904 may exist as part of the application processor 1906 (such as part of a physical CPU package) in which case, at least a portion of the memory 1908 may be shared by the application processor 1906 and graphics processor 1904, although at least a portion of the memory 1908 may be exclusive to the graphics processor 1904, or the graphics processor 1904 may have a separate store of memory. The memory 1908 may comprise a pre-allocated region of a buffer (e.g., framebuffer); however, it should be understood by one of ordinary skill in the art that the embodiments are not so limited, and that any memory accessible to the lower graphics pipeline may be used. The memory 1908 may include various forms of random access memory (RAM) (e.g., SDRAM, SRAM, etc.) comprising an application that makes use of the graphics processor 1904 to render a desktop or 3D graphics scene. A memory controller hub, such as memory controller hub 116 of FIG. 1, may access data in the memory 1908 and forward it to graphics processor 1904 for graphics pipeline processing. The memory 1908 may be made available to other components within the computing device 1900. For example, any data (e.g., input graphics data) received from various I/O sources 1910 of the computing device 1900 can be temporarily queued into memory 1908 prior to their being operated upon by one or more processor(s) (e.g., application processor 1906) in the implementation of a software program or application. Similarly, data that a software program determines should be sent from the computing device 1900 to an outside entity through one of the computing system interfaces, or stored into an internal storage element, is often temporarily queued in memory 1908 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 1910 may include one or more I/O devices that are implemented for transferring data to and/or from the computing device 1900 (e.g., a networking adapter); or, for a large-scale non-volatile storage within the computing device 1900 (e.g., hard disk drive). User input devices, including alphanumeric and other keys, may be used to communicate information and command selections to graphics processor 1904. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 1900 may be employed to observe gestures, record audio and video and to receive and transmit visual and audio commands.

I/O sources 1910 configured as network interface(s) can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1900 may vary from implementation to implementation depending upon numerous factors, such as price constraints, performance requirements, technological improvements, or other circumstances. Examples include (without limitation) a mobile device, a personal digital assistant, a mobile computing device, a smart-phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications.

Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiments provide for an apparatus comprising processing logic to receive data from an input buffer, where the data defines a set of data points having one or more dimensions (e.g., k-dimensions). The processing logic is configured to construct a left-balanced and complete point k-d tree of the data points in-place within the input buffer without requiring a separate output buffer to store output data. The left-balanced and complete point k-d tree may be used for numerous point-based data operations including database operations, pattern matching operations, and computer graphics operations such as photon mapping and ray-tracing. In one embodiment the processing logic is accessed via one or more instructions provided by a graphics processor. In one embodiment the processing logic is performed by shader program logic executing on execution resources of the graphics processor. In one embodiment at least a portion of the logic may be performed in parallel with an additional processor coupled to the processing logic on a system on a chip integrated circuit.

In one embodiment the logic is further configured to order the first sub-tree into a first heap structure having a first ordering and order the second sub-tree into a second heap structure having a second ordering. The first ordering opposite of the second ordering, such that, for example, one of the sub-trees is a max heap while the other of the sub-trees is a min heap. The first and second heap structures are configured to satisfy a heap property based on respective orderings of the heap structures (e.g., min or max, up or down, etc.). In one embodiment the logic further configured to perform a first set of operations to iteratively swap and reorder values for points positioned as root nodes of the first and second sub-tree and a second operation to swap the value of the first point with the value of a point within the first child node or second child node of the first point.

A further embodiment provides for a data processing system comprising or including a first processor coupled to a second processor on a single die. The second processor includes one or more graphics engines. The data processing system additionally includes logic to perform in-place construction of a left-balanced and complete point k-d tree from a set of input data points. In one embodiment the logic is coupled to the second processor. In one embodiment the logic is integrated within the second processor. In one embodiment the logic is connected to the second processor via an internal system bus or a network interface.

Additionally, one embodiment provides for a computer implemented method including receiving a set of data points from an input buffer; and constructing, from the set of data points, a left-balanced and complete point k-d tree in-place within the input buffer, the constructing including partitioning the set of data points into multiple sub-trees and iteratively swapping data point values within the input buffer. In one embodiment the constructing additionally includes selecting a first point within the set of data points as a root node of the point k-d tree or as a pivot node for use in constructing the point k-d tree and organizing the set of data points into a first sub-tree and a second sub-tree, the first sub-tree rooted at a first child node of the first point and the second sub-tree rooted at a second child node of the first point.

In a further embodiment the constructing additionally includes ordering the first sub-tree into a first heap structure having a first ordering; ordering the second sub-tree into a second heap structure having a second ordering, the first ordering opposite of the second ordering, and the first and second heap structure configured to satisfy a heap property based on the orderings; iteratively determining whether a first child node of the first point is greater than the second child node of the first point, swapping values of the first child node and the second child node in response to the determining, restoring the heap property of the first heap structure of the first sub-tree, and restoring the heap property of the second heap structure of the second sub-tree; and swapping the values of the first point with the value of a point within the first child node or second child node of the first point.

In a further embodiment the construction additionally Includes initializing a first iterator for the first sub-tree and incrementing the first iterator to locate a node of the first sub-tree having a value that is greater than the value of a current pivot node; initializing a second iterator for the second sub-tree and incrementing the second iterator to locate a node of the second sub-tree having a value that is less than the value of the pivot node; initializing a first begin index for the first sub-tree to index the root node of the first sub-tree; and initializing a second begin index to index the root node of the second sub-tree. In one embodiment the constructing additionally comprising swapping the values at the nodes located by the first iterator and the second iterator; updating the value of the pivot node after determining the pivot node is an incorrect pivot node; setting the first begin index or the second begin index to the node from which the value of the pivot node is updated; and may additionally include incrementing the first iterator and second iterator beginning from the first begin index and the second begin index respectively; and after completing processing for the root node or the pivot node, recursively processing the first sub-tree and second sub-tree in parallel.

In one embodiment, any computer implemented method described herein can be performed via logic on a non-transitory machine-readable medium or a non-transitory machine-readable storage device storing instructions which, when executed by one or more processors, causes the one or more processors to perform the computer implemented method. Additionally, one or more non-transitory machine readable storage mediums can store data which, when read by one or more machines, causes the one or more machines to manufacture one or more integrated circuits to perform operations comprising the computer implemented method.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
   logic to receive data from an input buffer, the data defining a set of data points, and construct a left-balanced and complete point k-d tree of the data points in-place within the input buffer, wherein the point k-d tree is constructed by, at least in part, partitioning the set of data points into multiple sub-trees and iteratively swapping data point values within the input buffer.

2. The graphics processing apparatus as in claim 1, additionally comprising:
one or more graphics engines including programmable execution resources, the programmable execution resources to provide one or more instructions to construct the point k-d tree via the logic.

3. The graphics processing apparatus as in claim 2, the one or more graphics engines to implement the logic via one or more shader program instructions.

4. The graphics processing apparatus as in claim 1, the logic further to select a first point within the set of data points as a root node of the point k-d tree and organize the set of data points into a first sub-tree and a second sub-tree, the first sub-tree rooted at a first child node of the first point and the second sub-tree rooted at a second child node of the first point.

5. The graphics processing apparatus as in claim 4, the logic further to order the first sub-tree into a first heap structure having a first ordering and order the second sub-tree into a second heap structure having a second ordering, the first ordering opposite of the second ordering and the first and second heap structures configured to satisfy a heap property based on respective orderings of the structures.

6. The graphics processing apparatus as in claim 5, the logic further to perform a first set of operations to iteratively swap and reorder values for points positioned as root nodes of the first and second sub-tree and a second operation to swap the value of the first point with the value of a point within the first child node or second child node of the first point.

7. The graphics processing apparatus as in claim 1, the logic further to select a first point within the set of data points as a pivot node, organize the set of data points into a first sub-tree and a second sub-tree, the first sub-tree rooted at a first child of the first point and the second sub-tree rooted at a second child of the first point.

8. The graphics processing apparatus as in claim 7, the logic further to:
initialize a first iterator including logic to iterate through the first sub-tree;
initialize a second iterator including logic to iterate through the second sub-tree;
initialize a first begin index for the first sub-tree to index a root node of the first sub-tree; and
initialize a second begin index to index the root node of the second sub-tree.

9. The graphics processing apparatus as in claim 8, the logic further to:
increment the first iterator to locate a node of the first sub-tree having a value that is greater than the value of the pivot node;
increment the second iterator to locate a node of the second sub-tree having a value that is less than the value of the pivot node; and
swap the values at the nodes located by the first iterator and the second iterator.

10. The graphics processing apparatus as in claim 9, the logic further to:
update the value of the pivot node after determining the pivot node is an incorrect pivot node;
set the first begin index or the second begin index to the node from which the value of the pivot node is updated; and
additionally increment the first iterator and second iterator beginning from the first begin index and the second begin index respectively.

11. A data processing system comprising:
a first processor;
a second processor coupled to the first processor on a single die, the second processor including one or more graphics engines; and
logic to perform in-place construction of a left-balanced and complete point k-d tree from a set of input data points, wherein the logic constructs the point k-d tree by, at least in part, partitioning the set of data points into multiple sub-trees and iteratively swapping data point values within the input buffer.

12. The data processing system as in claim 11, the logic further to select a first point within the set of data points as a root node or pivot node of the point k-d tree and organize the set of data points into a first sub-tree and a second sub-tree, the first sub-tree rooted at a first child of the first point and the second sub-tree rooted at a second child of the first point.

13. The data processing system as in claim 12, the logic further to order the first sub-tree into a first heap structure having a first ordering and order the second sub-tree into a second heap structure having a second ordering, the first ordering opposite of the second ordering, the first and second heap structures configured to satisfy a heap property based on respective orderings of the structures, and the first and second sub-trees ordered in parallel.

14. The data processing system as in claim 12, the logic further to:
initialize and increment a first iterator to locate a node of the first sub-tree having a value that is greater than the value of a current pivot node;
initialize and increment a second iterator to locate a node of the second sub-tree having a value that is less than the value of the current pivot node;
swap the values at the nodes located by the first iterator and the second iterator;
update the value of the pivot node after determining the pivot node is an incorrect pivot node; and
set a first begin index or a second begin index to the node from which the value of the pivot node is updated.

15. The data processing system as in claim 11, wherein the logic is stored on a non-transitory machine-readable storage device, the first or second processor configured to execute the logic from the storage device.

16. A non-transitory machine-readable medium storing instructions which, when executed by one or more processors, causes the one or more processors to perform operations including:
receiving a set of data points from an input buffer; and
constructing a left-balanced and complete point k-d tree of the data points in-place within the input buffer, the constructing including partitioning the set of data points into multiple sub-trees and iteratively swapping data point values within the input buffer.

17. The non-transitory machine-readable medium of claim 16, the constructing additionally comprising:
selecting a first point within the set of data points as a root node of the point k-d tree or as a pivot node for use in constructing the point k-d tree; and
organizing the set of data points into a first sub-tree and a second sub-tree, the first sub-tree rooted at a first child node of the first point and the second sub-tree rooted at a second child node of the first point.

18. The non-transitory machine-readable medium of claim 17, the constructing additionally comprising:
- ordering the first sub-tree into a first heap structure having a first ordering;
- ordering the second sub-tree into a second heap structure having a second ordering, the first ordering opposite of the second ordering, and the first and second heap structure configured to satisfy a heap property based on the respective orderings;
- iteratively determining whether a first child node of the first point is greater than the second child node of the first point, swapping values of the first child node and the second child node in response to the determining, restoring the heap property of the first heap structure of the first sub-tree, and restoring the heap property of the second heap structure of the second sub-tree; and
- swapping the values of the first point with the value of a point within the first child node or second child node of the first point.

19. The non-transitory machine-readable medium of claim 17, the constructing additionally comprising:
- initializing a first iterator for the first sub-tree and incrementing the first iterator to locate a node of the first sub-tree having a value that is greater than the value of a current pivot node;
- initializing a second iterator for the second sub-tree and incrementing the second iterator to locate a node of the second sub-tree having a value that is less than the value of the pivot node;
- initializing a first begin index for the first sub-tree to index the root node of the first sub-tree; and
- initializing a second begin index to index the root node of the second sub-tree.

20. The non-transitory machine-readable medium of claim 19, the constructing additionally comprising:
- swapping the values at the nodes located by the first iterator and the second iterator;
- updating the value of the pivot node after determining the pivot node is an incorrect pivot node; and
- setting the first begin index or the second begin index to the node from which the value of the pivot node is updated.

* * * * *